United States Patent
Nakata et al.

(10) Patent No.: US 9,052,569 B2
(45) Date of Patent: Jun. 9, 2015

(54) OPTICAL INSTRUMENT, AND CONTROL METHOD FOR OPTICAL INSTRUMENT

(75) Inventors: Koichi Nakata, Kokubunji (JP); Yuzuru Taguchi, Tachikawa (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/527,307

(22) Filed: Jun. 19, 2012

(65) Prior Publication Data

US 2012/0328277 A1     Dec. 27, 2012

(30) Foreign Application Priority Data

Jun. 23, 2011   (JP) ............................... P2011-139639
Jun. 23, 2011   (JP) ............................... P2011-139640

(51) Int. Cl.
- *G03B 3/10*      (2006.01)
- *G03B 3/00*      (2006.01)
- *G03B 13/32*     (2006.01)
- *H04N 5/232*     (2006.01)

(52) U.S. Cl.
CPC .. *G03B 3/10* (2013.01); *G03B 3/00* (2013.01); *G03B 13/32* (2013.01); *H04N 5/23212* (2013.01)

(58) Field of Classification Search
USPC ................ 396/79–82, 88, 103, 131, 137–139
See application file for complete search history.

(56) References Cited

U.S. PATENT DOCUMENTS

| | | | |
|---|---|---|---|
| 5,898,528 A * | 4/1999 | Fukino | .......................... 359/823 |
| 2007/0147818 A1 | 6/2007 | Mori | |
| 2009/0109316 A1* | 4/2009 | Matsui | ..................... 348/333.01 |
| 2011/0080497 A1* | 4/2011 | Ejima et al. | ................ 348/222.1 |
| 2011/0158622 A1* | 6/2011 | Saito et al. | ...................... 396/79 |

FOREIGN PATENT DOCUMENTS

| | | |
|---|---|---|
| JP | 01-304409 | 12/1989 |
| JP | 2009-169065 | 7/2009 |
| JP | 2010-186138 | 8/2010 |

* cited by examiner

*Primary Examiner* — Clayton E Laballe
*Assistant Examiner* — Minh Phan
(74) *Attorney, Agent, or Firm* — John C. Pokotylo; Straub & Pokotylo

(57) ABSTRACT

An optical instrument comprising a focusing lens provided inside a lens barrel, a ring member that is arranged to rotate with respect to a lens barrel, and to slide to a first position and a second position, a focusing mode setting section, provided on a camera body, for setting focusing mode, and a control section for, when the ring member has been slid to the first position, carrying out focusing in a focusing mode that was set in the focusing mode setting section, and when the ring member has been slid to the second position, stopping focusing the focusing mode that was set in the focusing mode setting section, and performing focusing of the focusing lens to a distance corresponding to an absolute position of the ring member.

7 Claims, 25 Drawing Sheets

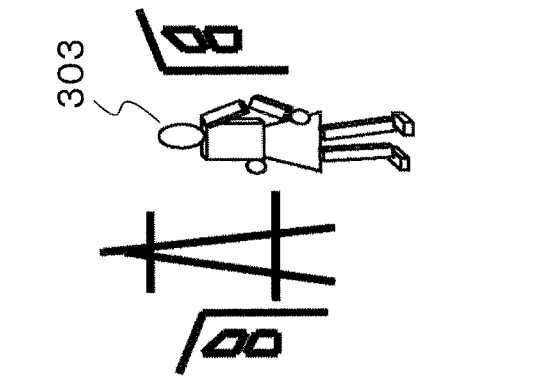
FIG. 8A
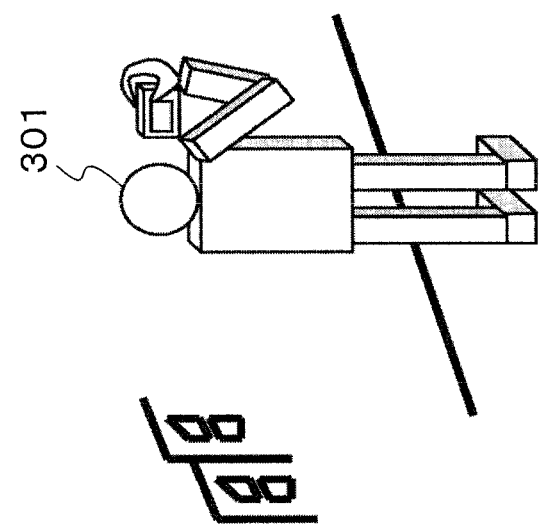
FIG. 8B
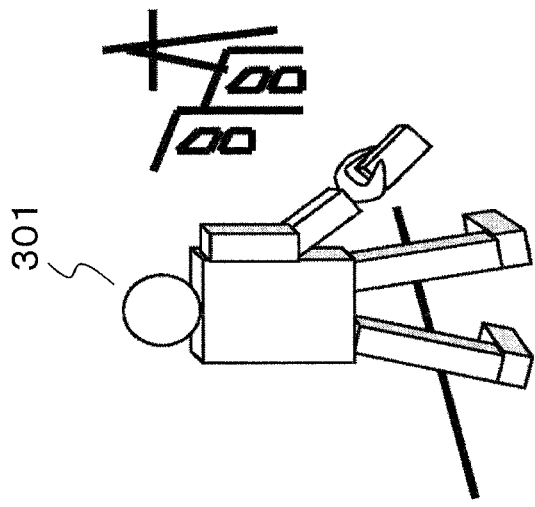

OPTICAL INSTRUMENT, AND CONTROL METHOD FOR OPTICAL INSTRUMENT

Benefit is claimed, under 35 U.S.C. §119, to the filing date of prior Japanese Patent Application Nos. 2011-139639 filed on Jun. 23, 2011, and 2011-139640 filed on Jun. 23, 2011. These applications are expressly incorporated herein by reference. The scope of the present invention is not limited to any requirements of the specific embodiments described in the applications.

BACKGROUND OF THE INVENTION

1. Field of the Invention

The present invention relates to an optical device having a ring member arranged on a lens barrel so as to rotate, and capable of switching a focus position in accordance with a position that has been set by rotation of the ring member, and a control method for an optical device.

2. Description of the Related Art

In an optical device having a zoom lens, switching of a normal mode for determining shooting range by freely moving the zoom, and step zoom mode where movement is in one large step to a predetermined position, by operation of the zoom switch, is known (Japanese patent laid-open No. 2009-169065 (laid-open Jul. 30, 2009)).

Also, in a camera having an automatic focusing unit for carrying out focusing of photographing lens, since it takes a long time to scan from the close up to the infinity end in order to perform focus, it has been proposed to limit a range that is scanned. For example, an imaging device that searches (scans) a range corresponding to a previously set shooting mode, in a case where reset conditions are not satisfied if a specified operation is carried out, and searches a current position if reset conditions are satisfied, is disclosed in Japanese patent laid-open No. 2010-186138 (laid-open Aug. 26, 2010). As specified conditions, there are a case where a manual focus operation is being carried out, a case where an AF lock switch has been operated, a case where a focus reset switch has been operated, and a case where a contrast AF switch has been operated.

SUMMARY OF THE INVENTION

An object of the present invention is to provide an optical instrument with which focusing mode is easily switched by operating a ring member that is provided on a lens barrel. Another object of the present invention is to provide an optical instrument having good operability with respect to being able to carry out focusing on a subject as the photographer intends, rapidly and accurately.

An optical instrument of the present invention comprises a focusing lens provided inside a lens barrel, a ring member that is arranged to rotate with respect to a lens barrel, and to slide to a first position and a second position, a focusing mode setting section, provided on a camera body, for setting focusing mode, and a control section for, when the ring member has been slid to the first position, carrying out focusing in a focusing mode that was set in the focusing mode setting section, and when the ring member has been slid to the second position, stopping focusing the focusing mode that was set in the focusing mode setting section, and performing focusing of the focusing lens to a distance corresponding to an absolute position of the ring member.

Also, an optical instrument of the present invention comprises a focusing lens for carrying out focusing, a ring member which is arranged to be rotatable with respect to a lens barrel, a first lens control section for switching a focusing operation from an operation using other than the ring member to an operation of continuously switching focus position in accordance with rotation speed at the time of the rotation operation of the ring member, and a second lens control section for switching a focus position corresponding to an operation position, from a focus operation using other than the ring member, in accordance with the position of the ring operation, Also, an optical instrument of the present invention comprises a focusing lens for carrying out focusing, a ring member which is arranged to be rotatable with respect to a lens barrel, a third lens control section for switching a focus position, in accordance with a focusing operation using other than the ring member, or in accordance with a ring operation of the ring member, and a fourth lens control section for switching a focusing operation equivalent to the operation position, regardless of a focusing operation using other than the lens operation member, in accordance with position of a ring operation of the ring member.

A control method of the present invention, for an optical instrument comprising a focusing lens provided in a lens barrel, a ring member that is arranged to rotate with respect to a lens barrel, and to slide to a first position and a second position, and a focusing mode setting section, provided on a camera body, for setting focusing mode, comprises, when the ring member has been slid to the first position, carrying out focusing in a focusing mode that was set in the focusing mode setting section, and when the ring member has been slid to the second position, stopping focusing the focusing mode that was set in the focusing mode setting section, and performing focusing of the focusing lens to a distance corresponding to an absolute position of the ring member.

Also, an optical instrument of the present invention comprises a focusing lens provided inside a lens barrel, a ring member that is arranged to rotate with respect to a lens barrel, and to slide to a first position and a second position, a slide position determination section for detecting position of the ring member in a slide direction, a preset distance determination section for determining a preset distance that has been set based on position of the ring member in the rotation direction, and an automatic focus control section for automatically carrying out focusing of the focusing lens, wherein the automatic focus control section carries out switching of focusing mode based on the position in the slide direction that has been determined by the slide position determination section, and automatically carries out focusing of the focusing lens using the preset distance, at one of either the first or second position.

BRIEF DESCRIPTION OF THE DRAWINGS

FIG. 8A and FIG. 8B are drawings showing the appearance of taking photographs when set to range focus mode, with the camera of the first embodiment of the present invention.

DETAILED DESCRIPTION OF THE PREFERRED EMBODIMENTS

Figure 1:
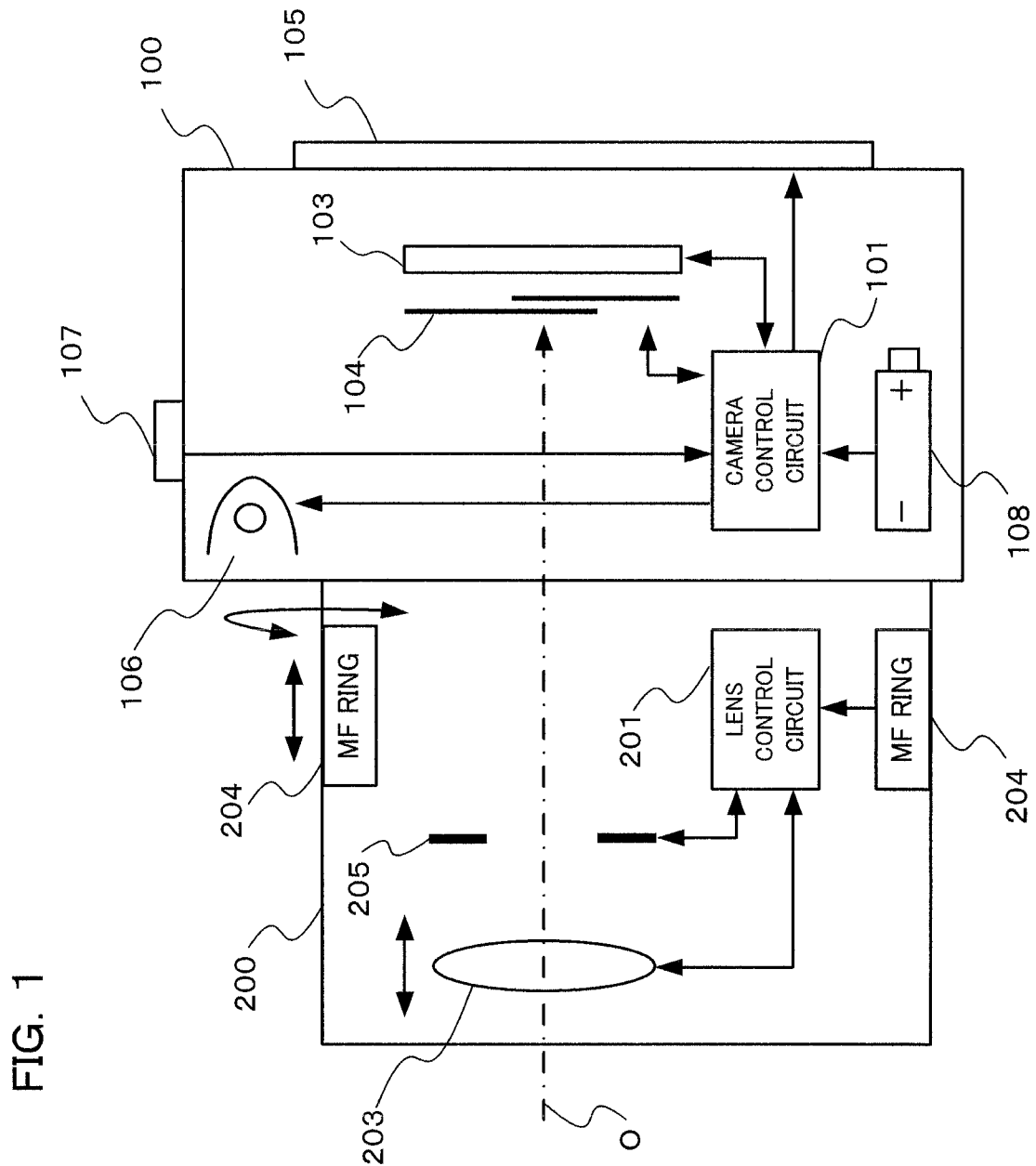
FIG. 1 is a block diagram showing the internal structure of a camera relating to one embodiment of the present invention.

Preferred embodiments using a camera to which the present invention has been applied will be described in the following in accordance with the drawings. FIG. 1 is a block diagram showing the structure of a camera relating to a first embodiment of the present invention, and this camera is a digital camera, comprising a camera body 100 and an interchangeable lens 200. The interchangeable lens 200 is removably attached to the camera body 100 by means of a bayonet mount. With this embodiment, the camera body 100 and the interchangeable lens 200 are constructed separately, but they may also be constructed integrally.

A camera control circuit 101, image sensor 103, focal plane shutter 104, display monitor 105, strobe unit 106, release button 107 and battery 108 etc. are arranged inside the camera body 100. Also, a lens control circuit 201, focusing lens 203, MF (Manual Focus) ring 204 and aperture 205 etc. are arranged inside the interchangeable lens 200.

The camera control circuit 101 is made up of an ASIC (application-specific integrated circuit) including a CPU (central processing unit) 121 (refer to FIG. 2) etc., and peripheral circuits of the ASIC. If a photographer operates the release button 107, the camera control circuit 101 controls the image sensor 103 and focal plane shutter 104 etc., as well as carrying out firing control of the strobe unit 106 as required, and executes shooting operations etc. by means of the lens control circuit 201. Various sequences for the entire camera are collectively controlled in collaboration with a lens CPU 221 (referred to FIG. 2) within the lens control circuit 201, which will described later. This control is executed in accordance with programs that have been stored in a flash ROM 122 (referred to FIG. 2). Details of this camera control circuit 101 will be described later using FIG. 2.

The image sensor 103 is constructed using a solid-state image sensor such as a CCD (Charge Coupled Device) image sensor or a CMOS (Complementary Metal Oxide Semiconductor) image sensor, and converts a subject image that has been formed by the interchangeable lens 200 into image signals. Specifically, image signals are accumulated in the image sensor 103, or image signals are read out, in accordance with signals from the camera control circuit 101. In this specification, signals based on output from the image sensor 103 may be referred to as image data as well as image signals.

The focal plane shutter 104 performs opening and closing operations in response to an instruction from a shutter control circuit 126 (refer to FIG. 2) within the camera control circuit 101, based on the release button 107 being pressed down fully, and opens and closes subject light flux from the interchangeable lens 200. The opening and closing time is a time corresponding to a shutter speed that has been calculated by the camera control circuit 101.

The display monitor 105 is constituted by an LCD or organic EL etc. arranged on the rear surface or the like of the camera body. The display monitor 105 carries out live view display at the time of still picture shooting standby and movie shooting, playback display of taken images that have already been stored in accordance with the operation of a playback button etc., and display of setting information on menus screen or the like in response to operation of a menu button etc.

The strobe unit 106 irradiates supplementary light to a subject in accordance with a command from a strobe control circuit 125 (refer to FIG. 2) within the camera control circuit 101, in a case where the surrounding area is dark at the time of operation of the release button 107. This light emission is carried out in synchronization with an exposure operation of the focal plane shutter 104, using charge that has been stored in an emission capacitor (not shown).

The release button 107 is made up of a first release switch 132 (refer to FIG. 2) that turns on when the button is pressed down half way, and a second release switch 133 (refer to FIG. 2) that is turned on when the button is pressed down further from the half-pressed state to be pressed down fully. The camera control circuit 101 executes shooting preparation sequences, such as AE (auto exposure) operation and AF (autofocus) operation if the first release switch 132 is turned on. Also, if the second release switch 133 is turned on shooting is carried out by executing a series of shooting sequences to control the focal plane shutter 104 etc., acquire image data based on a subject image from the image sensor 103 etc., and store this image data in a storage medium.

The battery 108 supplies power to respective members and respective circuits within the camera body 100 and the interchangeable lens 200.

The lens control circuit 201 within the interchangeable lens 200 is made up of an ASIC including a lens CPU etc., and its peripheral circuits. In response to a command from the camera control circuit 101, or the user operating the MF ring 204, drive control etc. for the focusing lens 203 and the aperture 205 is carried out. Various lens information, such as focal length, set length, and aperture value, is sent in response to a request from the camera control circuit 101. This control is executed in accordance with programs that have been stored in a flash ROM (not shown). Details of this lens control circuit 201 will be described later using FIG. 2.

The focusing lens 203 moves in the optical axis direction based on instruction from the lens control circuit 201, and adjusts the focused state of the interchangeable lens 200. In this embodiment, the lens is described as a fixed focal length lens, but it may also be constituted by a zoom lens for which focal length can be varied.

The MF ring 204 is arranged on the outer periphery of the interchangeable lens 200, being capable of a rotation operation around the optical axis of the interchangeable lens 200 and also capable of a slide operation along the optical axis direction between a first position and a second position. By carrying out a rotation operation at a first position where the MF ring 204 has been slid toward the front of the interchangeable lens 200 (toward the subject), a manual focus operation is possible. Also, by performing a rotation operation at the second position where the MF ring 204 has been slid to the rear of the interchangeable lens 200 (imaging side), a range focus operation is possible. The first position and the second position of the MF ring 204 will be described later using FIG. 3 and FIG. 4.

The aperture 205 has its opening area changed based on instruction from the lens control circuit 201, and adjusts light amount of subject light flux that passes through the interchangeable lens 200.

Figure 2:
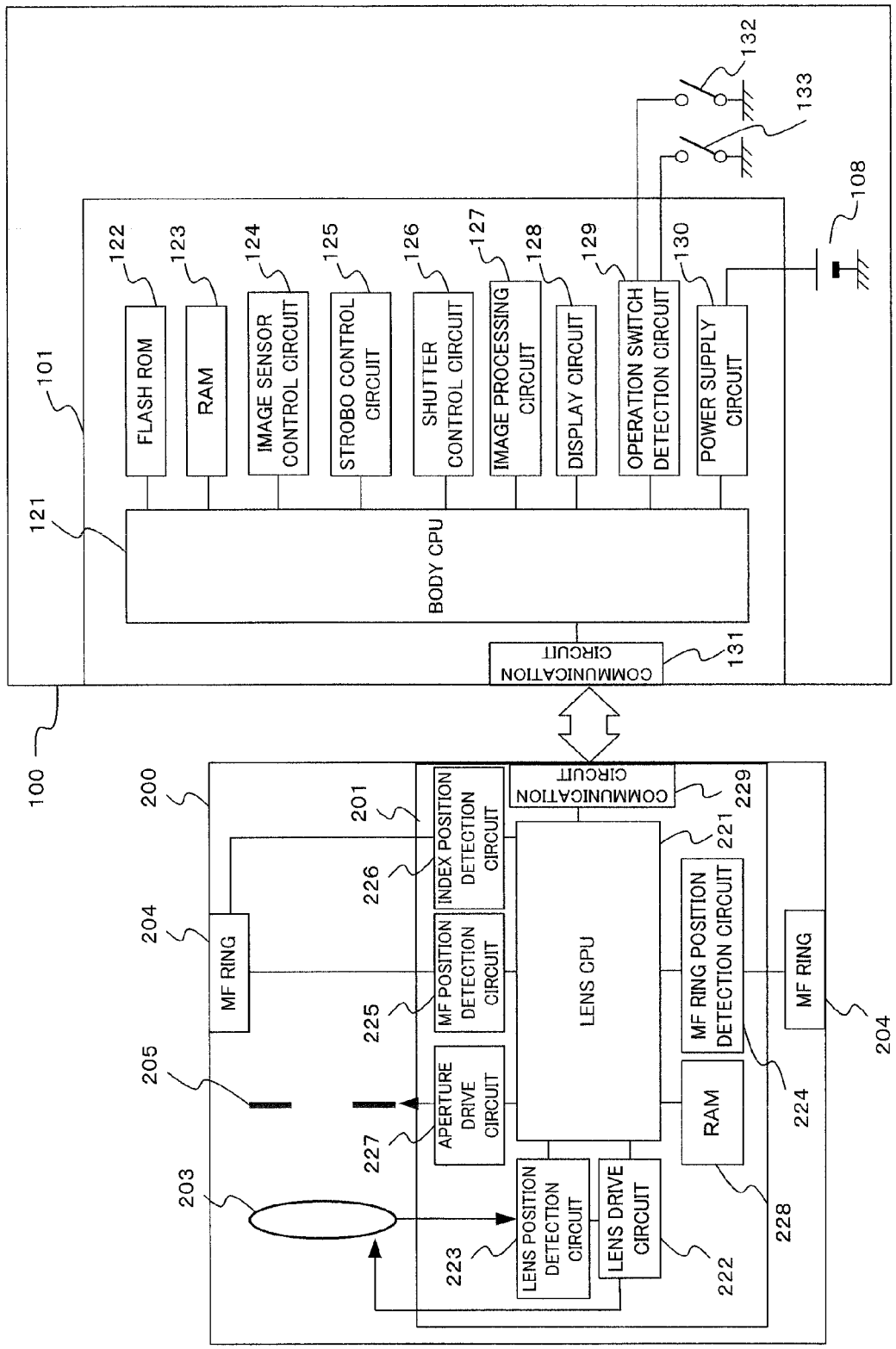
FIG. 2 is a block diagram mainly showing the electrical structure of a camera of a first embodiment of the present invention.

Next, details of the camera control circuit 101 lens control circuit 201 will be described using FIG. 2. A body CPU 121 is provided within the camera control circuit 101, and a flash ROM (read only memory) 122, RAM (random access memory) 123, image sensor control circuit 124, strobe control circuit 125, shutter control circuit 126, image processing circuit 127, display circuit 128, operation switch detection circuit 129, a power supply circuit 130, and communication circuit 131 are connected to this body CPU 121. Input and output of various signals is carried out between these various circuits and the body CPU 121.

The body CPU 121 collectively controls the entire camera in accordance with programs etc. that are stored in the flash ROM 122. Also, communication is possible with the lens CPU 221 by means of a camera body communication circuit 131 and a lens communication circuit 229, with control instructions being output and lens information such as lens position of the focusing lens 203 being acquired.

The flash ROM 122 is an electrically rewritable non-volatile memory, and stores programs to be executed by the body CPU 121, as was described previously, and also stores various adjustment values etc. Memory other than flash ROM may also be adopted as long as it is non-volatile memory. The RAM 123 is an electrically rewritable volatile memory, such as DRAM (dynamic random access memory) or SDRAM (synchronous DRAM), and temporarily stores various information for processing in the body CPU 121.

The image sensor control circuit 124 executes imaging operations at the image sensor 103 in order to convert a subject image into image signals, at the time of executing processing operations that require image data, such as live view display, AE, AF, exposure at the time of shooting etc. As imaging operations, charge storage control and image signal readout etc. are carried out for the image sensor 103.

The strobo control circuit 125 is connected to the strobe unit 106, and carries out charging and emission control of the strobe unit 106. The strobo control circuit 125 carries out emission amount control so as to achieve optimum exposure based on lens position information of the focusing lens 203 that has been acquired from the lens CPU 221, for example. The shutter control circuit 126 is connected to the focal plane shutter 104, and carries out opening and closing control of the focal plane shutter 104 based on a shutter speed signal from the body CPU 121.

The image processing circuit 127 applies image processing such as A/D conversion and filter processing on image signals that have been output from the image sensor 103. Also, in applying image processing, image processing for live view display is carried out, and live view display is performed on the display monitor 105 based on the processed image signals. Image processing of a taken image for storage is also carried out, and this processed image data is stored in a storage medium (not shown).

Also, the image processing circuit 127 carries out extraction processing by subjecting high-frequency components from image signals within a focus detection region to high pass filter processing, and calculates an AF evaluation value. As a result the image processing circuit 127 provides a function as a focus detection section for carrying out focus detection. In this embodiment, well-known contrast AF has been adopted in the focus detection, where the focusing lens 203 is moved and the position at which the AF evaluation value becomes a peak is made a focus position. The focus detection method is not limited to contrast AF, and another method such as phase difference AF may also be adopted.

The display circuit 128 is connected to the display monitor 105, and carries out live view display, playback display of taken images that have been stored in a storage medium, and display of various shooting information such as menu screens.

The operation switch detection circuit 129 is connected to the first release switch 132 linked to the release button 107, and to the second release switch 133 and other detection switches (not shown), and detects operating states of the switches, outputting detection results to the body CPU 121.

The other detection switches are a power supply switch that is linked to a power supply button for turning a power supply on off, a shooting mode switch for switching shooting modes of the camera, a menu switch that is linked to a menu button for displaying menu screens, a playback switch that is linked to a playback button for causing execution of playback display of taken images stored in the storage medium, a mount switch for detecting an attachment state of the interchangeable lens 200, and a movie switch that is linked to a movie button for instructing start and stop of movie shooting, etc.

Setting of various shooting information, such as focusing mode, is carried out through the above-described menu screens. In this embodiment there are two focusing modes set in the menu screens, namely auto focus mode (AF mode) where focusing of the focusing lens 203 is carried out automatically, and manual focus mode (MF mode) where focusing is carried out manually. Focusing mode setting of the camera body 100 may also be carried out using a method other than with the menu screens as in this embodiment, such as setting using dedicated buttons. The operation switch detection circuit 129 and body CPU 121 etc. are provided in the camera body, and provide a function as a focusing mode setting section for setting the focusing mode.

The power supply circuit 130 is connected to the battery 108, and performs smoothing and boosting etc. of the power supply voltage to supply power to each of the circuits and each of the members within the camera body 100 and the interchangeable lens 200.

The camera body communication circuit 131 of the camera body has a synchronization signal terminal and a plurality of communication terminals, such as data terminals, provided on a mount section at an outer part of the camera body 100. Communication is carried out between the body CPU 121 and the lens CPU 221 by means of the lens communication circuit 229. Communication between the camera body communication circuit 131 of the camera body and the lens communication circuit 229 is carried out by asynchronous communication when the body and the detachable lens are initially attached, but after acquiring information on the interchangeable lens at the camera body side communication is carried out using synchronous communication provided that the attached interchangeable lens 200 is capable of synchronous communication.

The lens CPU 221 is provided within the lens control circuit 201, and a lens drive circuit 222, lens position detection circuit 223, MF ring position detection circuit 224, MF position detection circuit 225, index position detection circuit 226, aperture drive circuit 227, RAM 228, and communication circuit 229 are connected to this lens CPU 221.

The lens CPU 221 carries out control within the interchangeable lens 200 in accordance with programs and various adjustment values that have been stored in a flash ROM (not shown) connected to the lens CPU 221 that is provided within the interchangeable lens, output signals from the lens position detection circuit 223, MF ring position detection circuit 224, MF position detection circuit 225, and index position detection circuit 226, and control instructions from the body CPU 121. Specifically, various drive control is carried out such as lens drive of the focusing lens 203 and aperture drive of the aperture 205. Also, communication with the body CPU 121 is carried out by means of the camera body communication circuit 131 and the lens communication circuit 229, to receive operation instructions from the body CPU 121 and transmit information representing the lens state, such as lens operating state and optical data of the interchangeable lens 200.

The lens drive circuit 222 is configured including an actuator, such as a stepping motor, and a motor driver, and carries out drive control of the focusing lens 203 in the optical axis direction. Also, in the case where focusing is carried out in range focus mode (RF mode), which will be described later, braking (acceleration and deceleration) control of the focusing lens 203 is carried out using synchronization signals for synchronous communication from the camera body 100 as timing signals. Drive control using a so-called wobbling operation where the focusing lens 203 is finely driven in opposite directions, is also possible.

The lens position detection circuit 223 carries out position detection of the focusing lens 203. This lens position detection circuit 223 is constructed including a photo interrupter (PI) circuit for converting a rotational amount of a drive motor, such as the stepping motor included in the lens drive circuit 222, to a number of pulses. A position detection result from the lens position detection circuit 223 is output as a number of pulses from a reference position such as the infinity end, and this number of pulses represents an absolute position of the focusing lens 203.

The MF ring position detection circuit 224 detects a slide position of the MF ring 204 in the optical axis direction of the interchangeable lens 200. Specifically, the MF ring 204 is capable of sliding to two positions, namely a manual focus operation position (MF position, first position) when it has been slid towards the front of the interchangeable lens 200, and a range focus operation position (RF position, second position) when it has been slid towards the rear of the interchangeable lens 200. The MF ring position detection circuit 224 detects whether or not the MF ring 204 is at the first position or at the second position. This position detection mechanism will be described later using FIG. 5.

The MF position detection circuit 225 is constructed including a PI circuit, and detects an amount of relative positional change of the MF ring 204 in the rotational direction about the optical axis center of the interchangeable lens 200. Specifically, when the position of the MF ring 204 that has been detected by the MF ring position detection circuit 224 is the manual focus operation position (MF position, first position), rotation direction, rotation amount, rotational speed, etc. of the MF ring 204 can be detected based on pulse signals output from the PI circuit. A detection timer used in rotation detection of this MF ring 204 is a common built-in timer within the lens CPU 221. The structure of the photo interrupter of the PI circuit will be described later using FIG. 5.

The index detection circuit 226 is constructed including a linear encoder and an A/D conversion circuit etc., and carries out detection of range index corresponding to drive target position of the focusing lens 203. Specifically, when position of the MF ring 204 that has been detected by the MF ring position detection circuit 224 is the range focus position (RF position, second position), detection of range index position corresponding to a drive target position, set at a rotational direction position of the MF ring 204 around the optical axis center of the interchangeable lens 200, is carried out based on a result of A/D conversion of an encoder value. That is, the index detection circuit 226 carries out detection of absolute distance that has been set by the MF ring 204.

A mode for controlling the focusing lens 203 so as to be equivalent to a distance (preset distance) determined by the absolute position of the MF ring 204 in the rotational direction, when there has been a slide operation of the MF ring 204 to the RF position (second position), is referred to as range focus mode (RF mode). As a timing signal for a detection timer used when reading this encoder value, use is made of a lens communication synchronization signal for carrying out synchronous communication between the camera body 100 and the interchangeable lens 200. The structure of one example of a detection mechanism of the index detection circuit 226 that uses a linear encoder will described later using FIG. 6.

The aperture drive circuit 227 is configured including an actuator, such as a stepping motor, and a motor driver, and carries out opening operation control of the aperture 205 in accordance with an aperture value from the lens CPU 221.

The RAM 228 is a volatile memory for temporarily storing various information used by the lens CPU 221.

The lens communication circuit 229 has a synchronization signal terminal, and a plurality of communication terminals, such as data terminals, provided on a mount section at an outer part of the interchangeable lens 200, and engages with communication connection terminals of the camera body communication circuit 131 to carry out communication with the camera body. Control commands for the focusing lens 203 and the aperture 205 from the body CPU 221 are received via this lens communication circuit 229, and lens state information such as optical data, lens position information, and operating state are transmitted to the body CPU 221.

The camera control circuit 101 and the lens control circuit 201 function as a control section by controlling the camera together. Specifically, this control section carries out focusing in the focusing mode that has been set at the camera body side in the case where the MF ring (ring member) 204 has been slid to the first position, while when the MF ring 204 has been slid to the second position the control section stops focusing the focusing mode that was set in the camera body and performs focusing of the focusing lens 203 to a distance corresponding to the absolute position set by the MF ring 204.

Also, by having the camera control circuit 101 and the lens control circuit 201 working together to control the camera, they provide a function as a first lens control section for switching a focus operation from an operation using other than the MF ring 204 to an operation of continuously switching focus position in accordance with rotation speed at the time of the rotation operation of the MF ring 204, and a second lens control section for switching a focus operation from an operation using other than the MF ring 204 to an operation of switching focus position corresponding to an operation position in accordance with the position of the MF ring 204. Here, control by the first lens control section specifically corresponds to control for switching from AF mode to MF mode, but a focusing operation that does not use the MF ring 204 is not limited to AF mode, and may also be a manual focus operation carried out at the camera body side (the same as a third lens control section that will be described later). Control by the second lens control section corresponds to control in RF mode.

Also, by having the camera control circuit 101 and the lens control circuit 201 working together to control the camera, they provide a function as a third lens control section for switching a focus position in accordance with a focusing operation that does not use the MF ring 204 or in accordance with a ring operation of the MF ring 204, and a fourth lens control section for switching a focus position corresponding to an operation position corresponding to the operation position of the MF ring 204, regardless of whether there is a focusing operation using other than the MF ring 204. Here, control by the third lens control section specifically corresponds to control in AF mode or in MF mode, and control by the fourth lens control section specifically corresponds to control in RF mode.

Figure 3:
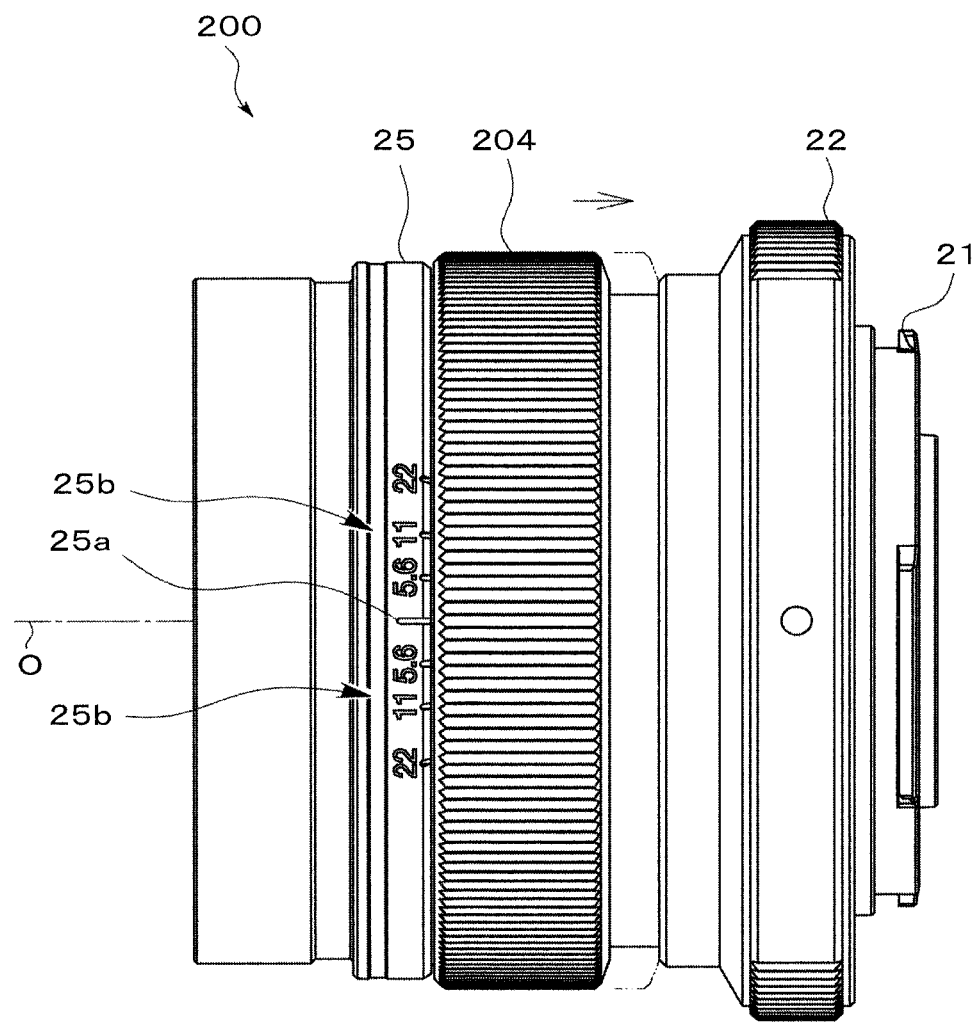
FIG. 3 is a plan view of a lens barrel of a camera of a first embodiment of the present invention, in a state where an MF ring is positioned at a first position.
Figure 4:
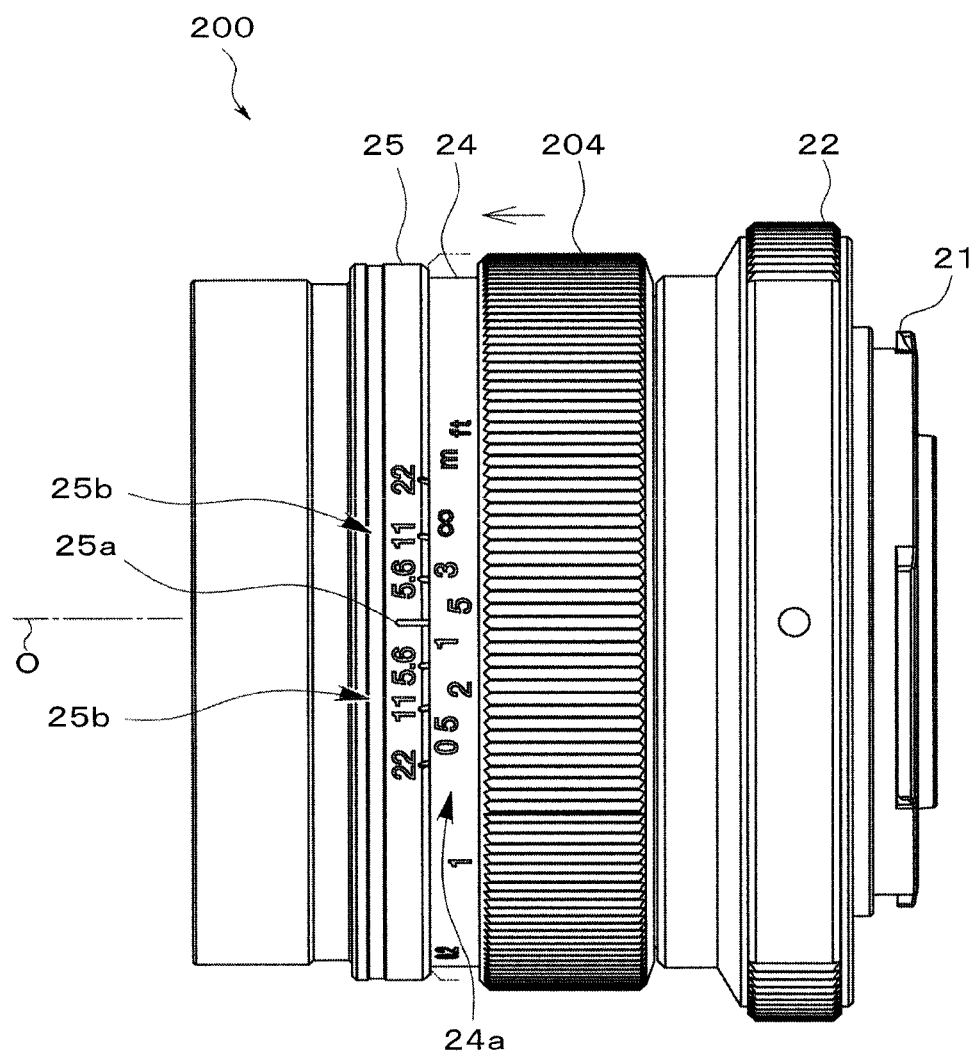
FIG. 4 is a plan view of a lens barrel of a camera of a first embodiment of the present invention, in a state where an MF ring is positioned at a second position.

Next, slide operation of the MF ring 204 to the first position and the second position will be described using FIG. 3 and FIG. 4. FIG. 3 shows the case where the MF ring 204 is at the first position, and FIG. 4 shows the case where the MF ring 204 is at the second position.

A bayonet section 21 is provided on the rear of the interchangeable lens 200. This bayonet section 21 is capable of attaching the interchangeable lens 200 to the camera body 100 by engaging with a bayonet section on the camera body 100. A base 22 is integrally formed with the bayonet section 21, and if the bayonet section 21 is attached to the camera body 100 it is fixed to the camera body 100.

The MF ring 204 has a substantially cylindrical shape arranged capable of rotation about an optical axis O, and capable of reciprocal movement in the optical axis O direction, at an outer peripheral section of a lens barrel of the interchangeable lens 200. The MF ring 204 is exposed on the outer periphery of the lens barrel, and is arranged so as to be held by a photographer's fingers. It is also possible to have a structure where only a part of the MF ring 204 is exposed on the outer periphery.

An index display frame 25 is part of an outer member of the lens barrel, and has its position fixed with respect to the base section 22. The index display frame 25 is arranged further to the front than the MF ring 204, even if the MF ring 204 is at the first position (MF position). An index 25a and a subject depth index 25b are displayed in this index display frame 25. The index 25a shows a reference index of a distance scale 24a provided on a distance display ring 24, which will be described later, while the subject depth index 25b shows subject depth corresponding to aperture value of the aperture 205 with respect to the distance scale 24a.

In the state shown in FIG. 3, if the MF ring 204 is subjected to a slide movement along the optical axis O to the rearward second position (imaging side, camera body side), then the distance display ring 24 is exposed, as shown in FIG. 4. The distance display ring 24 is a substantially cylindrical member arranged at an inner side of the MF ring 204, and when the MF ring 204 is at the first position does not move integrally with the MF ring 204. However, if the MF ring 204 is moved to the second position, the distance display ring 24 is capable of rotating integrally with the MF ring 204 about the optical axis O.

As shown in FIG. 4, the distance scale 24a showing the distance at which the focal length lens 203 is focused (in-focus distance) is shown on the outer peripheral surface of the distance display ring 24. The distance scale 24a has numerical values arrayed along a circumferential direction, representing distance from the minimum in-focus distance to infinity. By rotating the distance display ring 24 around the optical axis O with respect to the index display frame 25, the numerical value of the distance scale 24a pointed to by the index 25a is changed.

The distance display ring 24 has a restricted range of rotation about the optical axis O, and is only capable of rotating within the distance range indicated by the index 25a. Accordingly, the distance scale 24a displays numerical values of distance from the minimum in focus distance to infinity, with respect to the index 25a.

In this manner, with this embodiment, when the MF ring 204 is positioned at the first position (MF position), as shown in FIG. 3, the distance scale 24a of the distance display ring 24 is in a state where it can not be seen from the outside of the lens barrel. On the other hand, when the MF ring 204 is positioned at the second position (RF position), as shown in FIG. 4, the distance scale 24a is in a state where it can be seen from the outside of the lens barrel.

The distance display ring 24 is constructed so as to rotate about the optical axis O together with the MF ring 204 only when the MF ring 204 is at the second position, as was described previously, and when the MF ring 204 is at the first position (MF position) the MF ring 204 is capable of rotation independently of the distance display ring 24.

Figure 5:
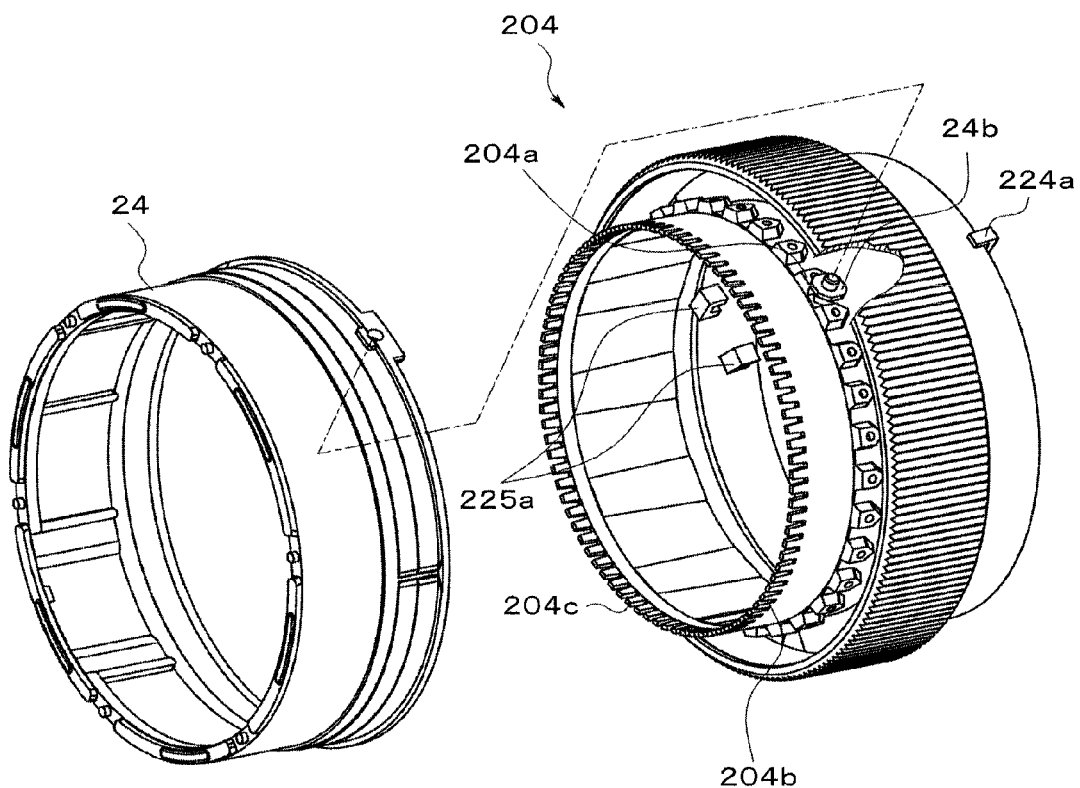
FIG. 5 is a perspective view for describing engagement of an MF ring and a distance display ring, with the camera of the first embodiment of the present invention.

Specifically, as shown in FIG. 5, an engagement pin 24b projects radially outward at an inner part of the distance display ring 24. Also, a plurality of engagement sections 204a are arranged on an inner cylindrical section 204b of the MF ring 204. When the MF ring 204 is at the first position (MF position), the engagement pin 24b is further to the rear than the engagement sections 204a of the MF ring 204, and even if the MF ring 204 is rotated around the optical axis O it is at a position that does not interfere with the engagement sections 204a. Also, when the MF ring 204 is at the second position (RF position), the engagement pin 24b is arranged as a position that overlaps the engagement sections 204a. Accordingly, when the MF ring 204 is at the second position the distance display ring 24 rotates about the optical axis O together with the MF ring 204, while when the MF ring 204 is at the first position, the distance display ring 24 remains stationary without rotating even if the MF ring 204 is rotated about the optical axis O.

Next, the structure of the detection mechanism for the MF ring position detection circuit 224 and the MF position detection circuit 225 will be described using FIG. 5. The MF ring position detection circuit 224 has a photo interrupter section 224a. This photo interrupter section 224a is fixed to the base section 22 or to a member integrally constituting the base section 22, and when the MF ring 204 is positioned at the second position the photo interrupter section 224a is at a position where at least a part of the MF ring 204 enters into a detection range, and when the MF ring 204 is positioned at the first position the photo interrupter section 224a is provided at a position outside the detection range.

With this embodiment, position of the MF ring 204 is detected by the photo interrupter section 224a, but detection is not limited to a photo interrupter, and another detection sensor may be adopted as long as it is capable of the determining the position of the MF ring 204. For example, it is possible to use a magnetic sensor or switch etc.

The MF position detection circuit 225 has a pair of photo interrupters 225a. Also, a plurality of slits/holes 204c provided a specified distance apart are provided in a circumferential direction of an inner cylinder 204b that rotates integrally with the MF ring 204. The pair of photo interrupters 225a are provided within a detection range of the slit holes 204c when the MF ring 204 is at the first position (MF position). Rotational conditions such as the rotation direction, rotation amount, and rotation speed of the MF ring 204 about the optical axis O are then detected based on output signals from the pair of photo interrupters 225a.

The detection sensor of the MF position detection circuit 225 can also be a magnetic rotary encoder or the like, for example, as long as it is capable of detecting rotation of the MF ring 204 when the MF ring 204 is at the first position (MF position).

Figure 6:
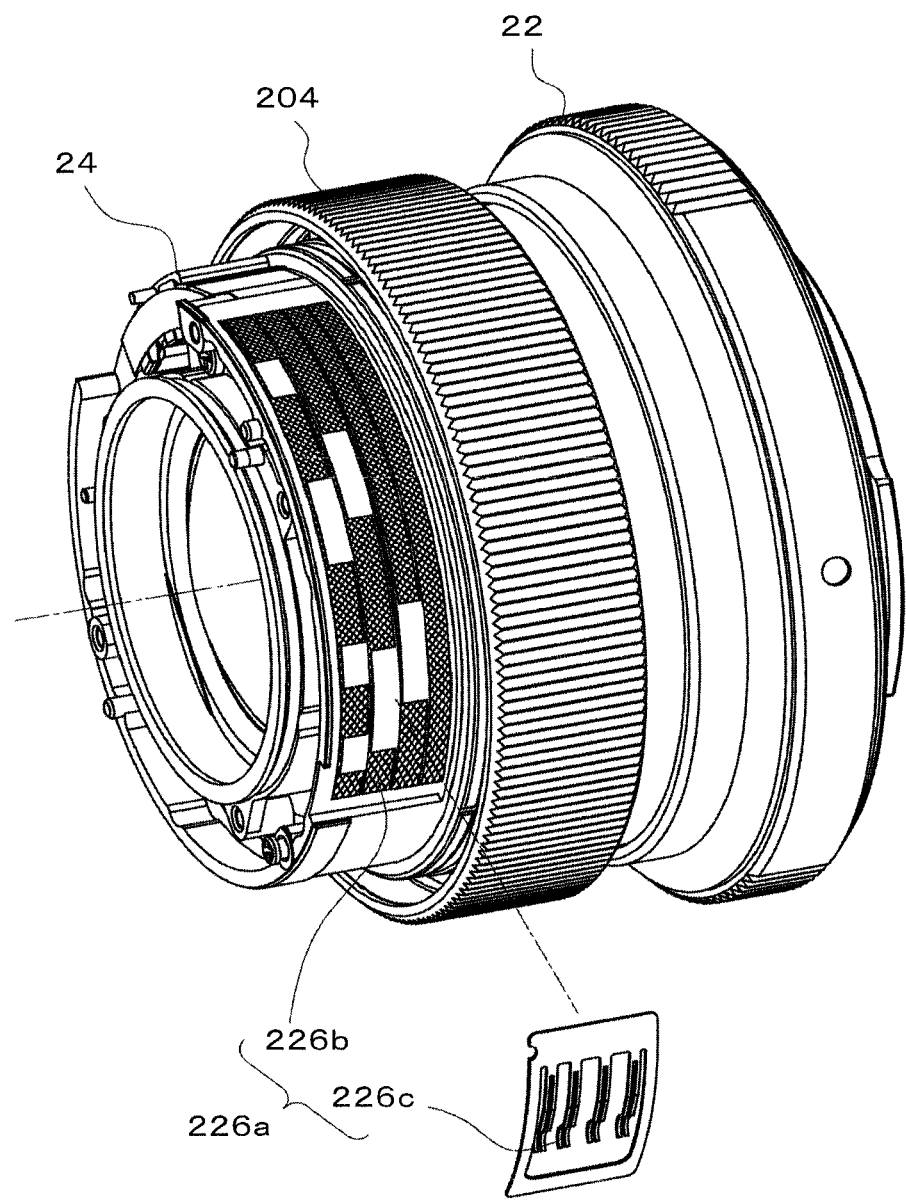
FIG. 6 is a perspective view showing the structure of an index position detection section of a camera of the first embodiment of the present invention.

Next, the detecting mechanism of the index position detection circuit 226 will be described using FIG. 6. The index position detection circuit 226 has an encoder section 226a. This encoder section 226a detects absolute rotation position about the optical axis O, with respect to the base section 22 of the distance display ring 24. The encoder section 226a comprises a plurality of code patterns 226b of a specified number of bits formed from conductive bodies, and a contact point section 226c formed from conductive bodies that slide on the code patterns 226b.

The code patterns 226b are arranged on the outer peripheral part of the distance display ring 24, while the contact point section 226c is arranged on a fixed frame formed integrally with the base section 22. If the distance display ring 24 is rotated about the optical axis O, the positions of the code patterns 226b connecting to the contact point section 226c vary in accordance with the rotation position. The index position detection circuit 226 detects changes in connection state between the code patterns 226b and the contact point section 226c, and detects absolute rotational position of the MF ring 204 about the optical axis O.

The index position detection circuit 226 may also adopt a structure other than a contact point type encoder, as long as it is capable of detecting absolute rotational position about the optical axis O, with respect to the base section 22. For example, it is also possible to have an optical or magnetic rotary encoder for absolute position detection, and it is also possible to have a potentiometer whose resistance varies in accordance with rotational position of the distance display ring 24 about the optical axis O. Also, in this embodiment, in the detection of absolute position, lens communication synchronization signals at the time of synchronous communication between the camera body 100 and the interchangeable lens 200 are used as detection timing signals in order to carry out detection at high-speed.

Figure 7:
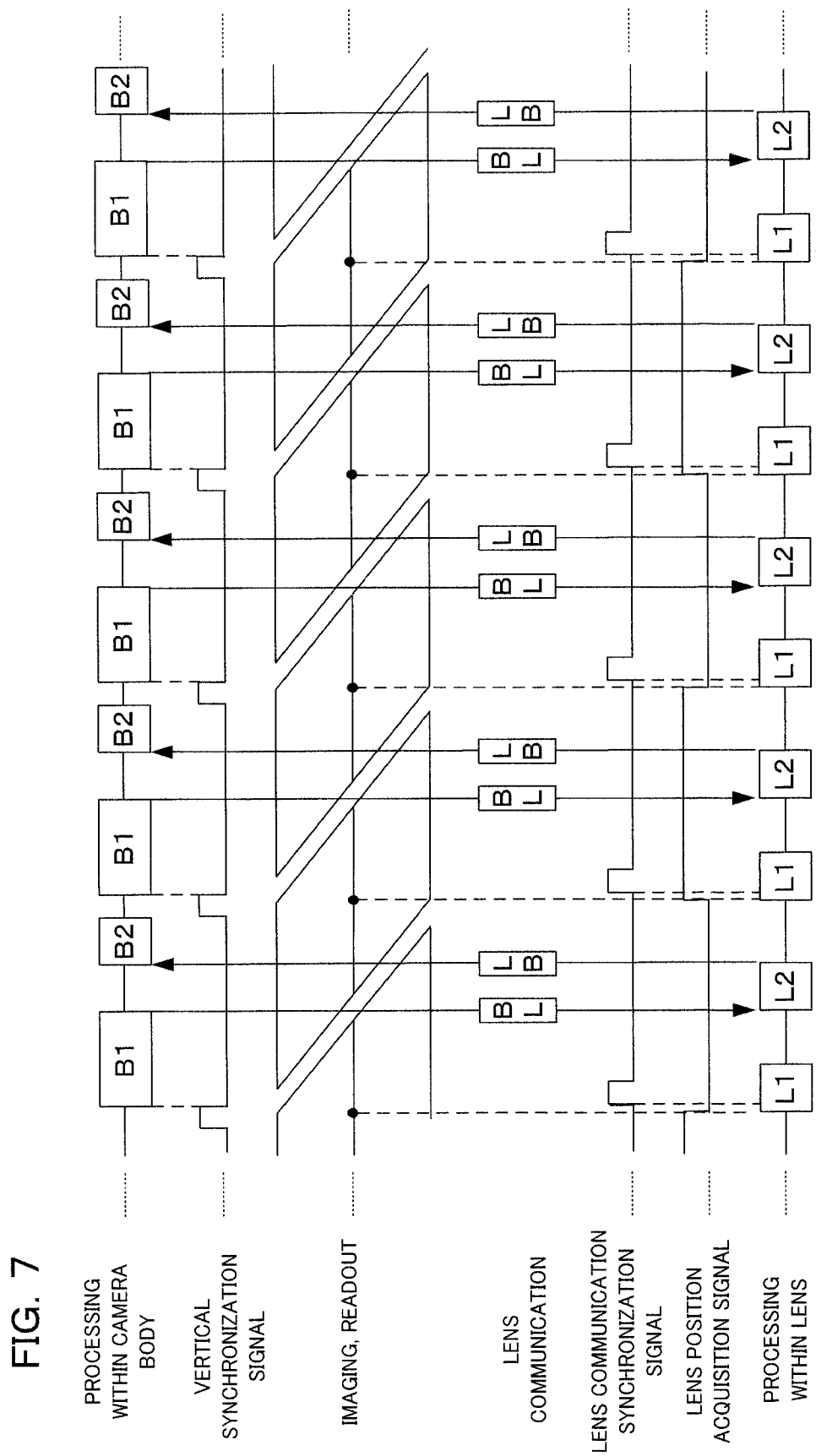
FIG. 7 is a timing chart showing one example of synchronous communication between an interchangeable lens and the camera body, in a camera of the first embodiment of the present invention.

Next, one example of synchronous communication that is performed between the camera body 100 and the interchangeable lens 200 will be described using FIG. 7. In FIG. 7, the horizontal axis represents the flow of time, while the vertical axis represents respective processing content and timing. In processing within the camera body, in process B1 display of a live view image, and calculation of an AF evaluation value, are carried out using image data that was acquired in the previous frame. Also, in process B2 AF calculations and various setting changes etc. are carried out based on lens state data that was acquired from lens state communication.

A vertical synchronization signal is a signal that is output in correspondence with each frame. With imaging and readout, a subject image is formed on the image sensor 103, and image data of this formed image is read out. The imaging and readout have a rhombus shape in FIG. 7, which is because in this embodiment, at the time of acquiring a live view image a rolling shutter is adopted, and imaging and readout are carried out sequentially every pixel line.

With the communication BL of the lens communication, a lens state data request command is transmitted from the camera body 100 to the interchangeable lens 200, and this command requests transmission of data representing the lens state of the interchangeable lens 200 to the camera body 100. Also in the communication BL, the interchangeable lens 200 transmits data representing the lens state of the interchangeable lens 200 to the camera body 100 in response to the lens state data request command.

A lens communication synchronization signal is generated in response to a vertical synchronization signal in the camera body 100, and this lens communication synchronization signals is output to the interchangeable lens 200 from a synchronization signal terminal of the camera body communication circuit 131. A lens position acquisition signal changes state at a predetermined time, for example, with the example shown in FIG. 7, at a time point after a time point substantially at the central point time of a charge accumulation time of the image sensor 103.

Also, processing L1 within the interchangeable lens 200 is processing to acquire position information of the focusing lens 203 at a time where the lens position acquisition signal changes state, and detect operating state of the MF ring 204 at a time when the lens communication synchronization signal is received. Also, processing L2 is processing to transmit position information of the focusing lens 203 and lens state data such as operating state of the MF ring 204, in response to a lens state data request command that has been received from the camera body 100.

As shown in the timing chart of FIG. 7, with the synchronous communication of this embodiment, processing B1 within the camera body 100 is executed in synchronization with the vertical synchronization signal, and a lens communication synchronization signal is transmitted to the interchangeable lens 200 in synchronization with the vertical synchronization signal.

Once processing B1 within the camera body 100 has been processed, a lens state data request command is transmitted to the interchangeable lens 200 by communication BL. Once the interchangeable lens 200 has received the lens state data request command, the lens state is detected and lens state data is transmitted by communication LB. The camera body 100 receives the lens state data and then executes processing B2.

Also, within the interchangeable lens 200, processing L1 for acquiring lens position is executed in synchronization with a lens position acquisition signal. This lens position acquisition signal is generated at a predetermined time, and with the example shown in FIG. 7, as was described previously, at a time point after half of a charge accumulation time has elapsed from the screen center of the image sensor 103. The interchangeable lens 200 acquires position information of the focusing lens 203 using the lens position detection circuit 223, at the time when the lens position acquisition signal changes state. These synchronous communications are all executed in synchronization with the lens communication synchronization signal.

Next the focusing modes of this embodiment will be described. In this embodiment, three focusing modes have been implemented, namely auto focus mode (AF mode), manual focus mode (MF mode) and range focus mode (RF mode). AF mode is carrying out automatic focusing of the focusing lens 203 using a climbing method that uses contrast AF, based on image data from the image sensor 103. MF mode is carrying out focusing, when the MF ring 204 is at the first position (MF position), by manually rotating the MF ring 204 and moving the focusing lens 203 in accordance with the rotation state at this time. AF mode and MF mode are set on the camera body 100 on menu screens, for example, as was described previously.

Differing from AF mode and MF mode, RF mode involves carrying out distance setting by rotating the MF ring 204, when the MF ring 204 is at the second position, and aligning the distance scale 24a of the distance display ring 24 with the index 25a, and then carrying out focus to this set distance. After the distance has been set beforehand in RF mode, if the power supply is turned off and then after that the power supply is turned on in RF mode, it is possible to focus to the distance that was set beforehand. For example, as shown in FIG. 8A, when the photographer 301 is strolling through a town etc., if a distance has been set before hand in RF mode, then as shown in FIG. 8B it is possible to rapidly take a shot even if a subject 303 suddenly comes into view.

Also, after distance setting in RF mode, even if MF mode or AF mode are switched to by sliding the MF ring 204 to the first position (MF position), if the MF ring 204 is slid to the second position focusing is immediately carried out to the set distance.

Next, a shooting operation of this embodiment will be described using the flowcharts shown in FIG. 9 to FIG. 11. The content of this flowchart is mainly executed by the body CPU 121 in accordance with programs stored in the flash ROM 122 within the camera body 100, but some content, when RF mode has been set during the flow for MF ring operation detection and operation processing, is mainly executed by the lens CPU 221 in accordance with programs stored in the flash ROM within the interchangeable lens 200.

Figure 9:
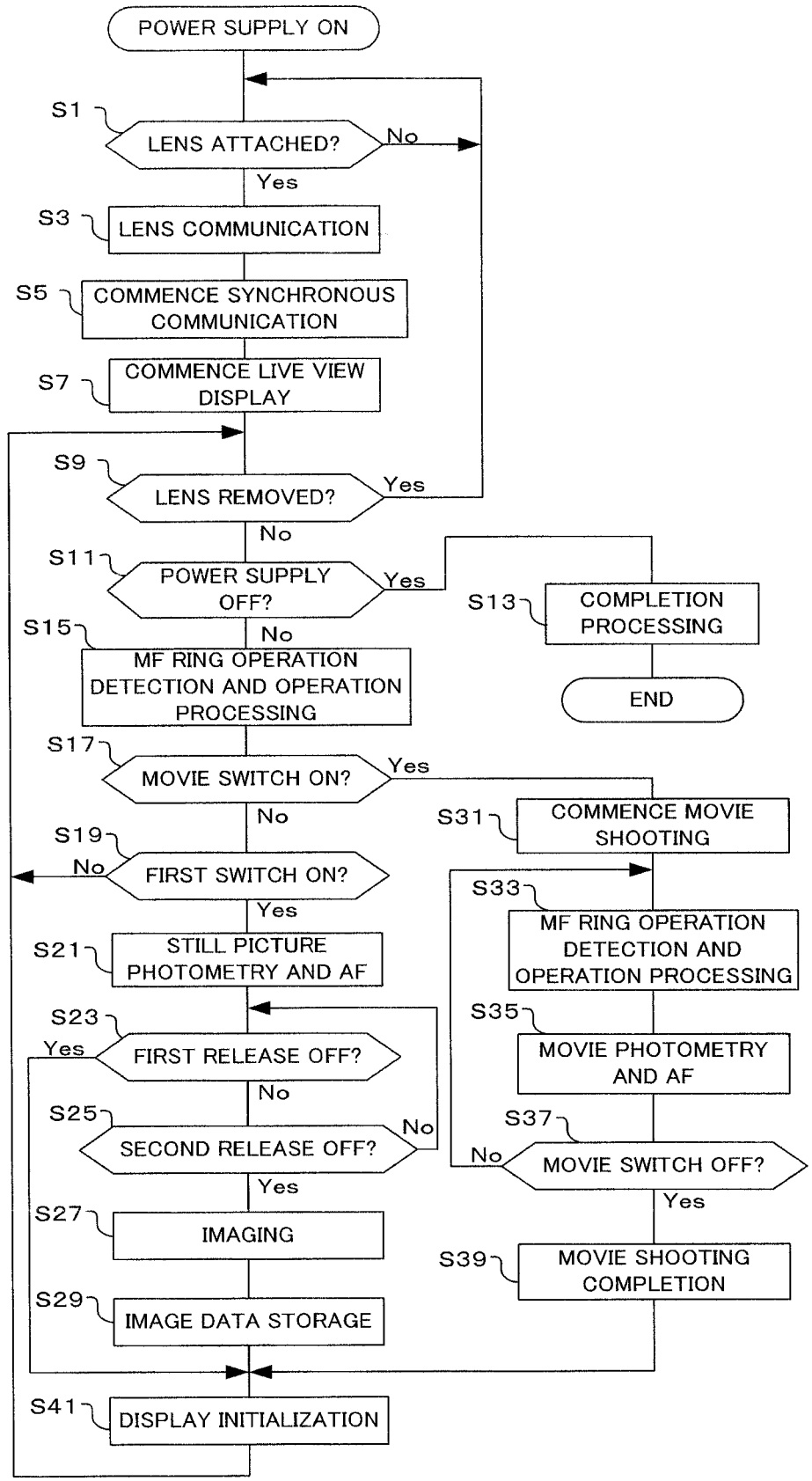
FIG. 9 is a flowchart showing shooting operation of the camera of the first embodiment of the present invention.
Figure 10:
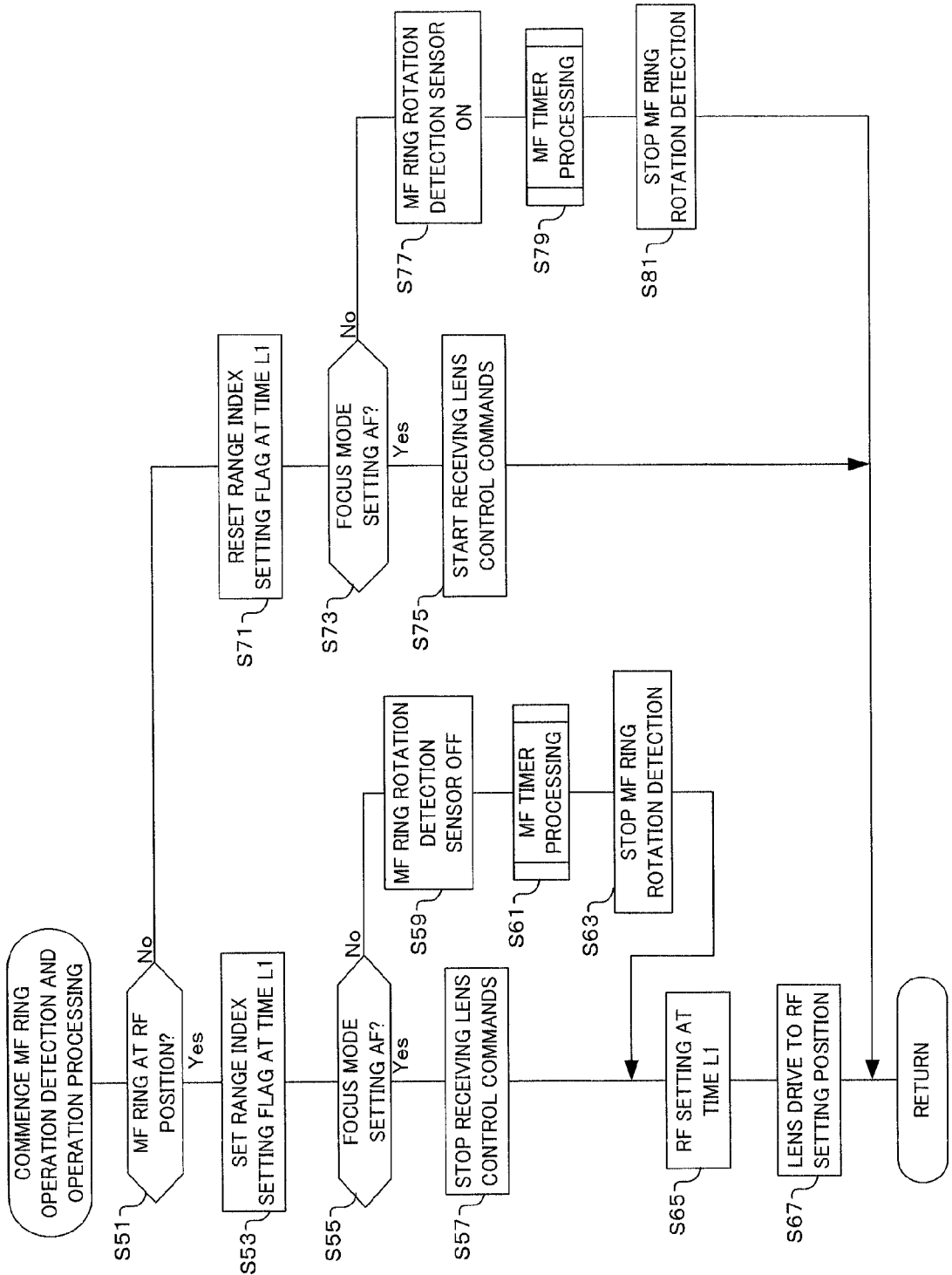
FIG. 10 is a flowchart showing MF ring operation detection and operation processing of the camera of the first embodiment of the present invention.

If the operation switch detection circuit 129 detects that the power supply button has been operated, operations shown in the flowchart of FIG. 9 are commenced. First it is determined whether or not the interchangeable lens 200 is attached (S1). The operation switch detection circuit 129 detects the state of a mount switch or the like, and this determination is carried out based on the result of this detection. If the result of this determination is that the interchangeable lens 200 is not attached, a standby state is entered waiting for attachment of the interchangeable lens 200. In the event that a shooting parameter change operation or playback operation for previously taken images, or setting or focusing mode, are carried out by the photographer during standby, the designated operation is executed.

If the result of determination in step S1 is that the interchangeable lens 200 has been attached to the camera body 100, lens communication is next carried out (S3). Here, asynchronous communication is carried out with the lens CPU 221 by means of the camera body communication circuit 131 and the lens communication circuit 229. Using this asynchronous communication, operating parameters of the focusing lens 203 etc., lens data such as optical data like chromatic aberration data, and information as to whether or not synchronous communication is possible etc. are stored in the RAM 123.

Once the lens communication has been carried out, synchronous communication commences (S5). Here, as was described using FIG. 7, a lens communication synchronization signal is transmitted from the camera body 100 to the interchangeable lens 200, and communication is carried out in synchronization with this signal. For every synchronization period, operating state of the focusing lens 203 etc. and lens state data such as the operating state of the MF ring 204 are acquired, and control operations corresponding to the lens state are executed. Every time the lens communication synchronization signal is output, the camera body acquires data relating to the lens position of the focusing lens 203, whether the MF ring 204 is at the first position or the second position, and information such as aperture value of the aperture 205, and executes control operations corresponding to this information. It is possible to transmit drive direction and drive amount of the focusing lens 203 in order to carry out AF control, and control commands relating to opening amount of the aperture 205, from the camera body 100 also. As a result of the lens communication that was carried out in step S3, synchronous communication is not carried out in the case where an interchangeable lens that is incapable of synchronous communication has been attached.

If synchronous communication has commenced, live view display is next commenced (S7). The body CPU 121 acquires image data by causing the image sensor 103 to be driven every synchronization period by the image sensor control circuit 124, and applies image processing for live view display in the image processing circuit 127. The display circuit 128 commences live view display on the display monitor 105 using image data that has been subjected to processing for live view display.

Once live view display has commenced, it is next determined whether or not the interchangeable lens 200 has been removed (S9). Here, determination of whether or not the interchangeable lens 200 has been removed is carried out based on at least one of communication state of the synchronous communication that was commenced in step S5, and, similarly to step S1, the state of a mount switch. If the result of this determination is that the interchangeable lens 200 has been removed, processing returns to Step S1.

If the result of determination in step S9 is that the interchangeable lens 200 has not been removed, and is attached, it is next determined whether or not the power supply is off (S11). Here, the operation switch detection circuit 129 detects the operating state of the power supply button, and the determination is carried out based on the result of this detection. If the result of this determination is that the power supply is off, termination processing is carried out (S13). Here, processing such as save processing for various data, a reset operation and power supply system disconnect processing etc. is carried out. Once termination processing has been carried out, this processing flow is ended.

If the result of determination in step S11 is that the power supply is not off, MF ring operation detection and operation processing is carried out (S15). Here, operation control and setting processing for the focusing lens 203 is carried out according to the operating state of the MF ring 204. Specifically, in the case where the MF ring 204 is at the second position having been slid to the rear (imaging side) of the interchangeable lens 200, RF mode is executed regardless of whether AF mode has been set or MF mode has been set at the camera body 100. On the other hand, if the MF ring 204 is at the first position having been slid towards the front (subject side) of the interchangeable lens 200, control is carried out in accordance with AF mode or MF mode that has been set at the camera body 100. Details of the MF ring operation detection and operation processing will be described later using FIG. 10.

Once MF ring operation detection and operation processing has been carried out, it is next determined whether or not a movie switch is on (S17). Here, the operation switch detection circuit 129 detects the operating state of the movie switch, and the determination is carried out based on the result of this detection.

If the result of determination in step S17 is that the movie switch is off, namely that the camera is in still picture shooting mode, it is then determined whether or not the first release switch is on (S19). The photographer presses the release button down halfway as a preparation step before shooting. Here the operation switch detection circuit 129 detects the operating state of the first release switch, and determination is carried out based on the result of this detection. If the result of this determination is that the first release switch is off, processing returns to step S9.

If the result of determination in step S19 is that there the first release switch is on, still picture photometry and AF are carried out (S21). Here, operations required for shooting, such as photometry for still picture shooting, exposure calculation, AF etc. are executed. Photometry and exposure calculation involves detecting subject brightness based on image data from the image sensor 103, and calculating exposure control values such as shutter speed and aperture value etc. for correct exposure based on this detected subject brightness. Also, in AF for still picture shooting, an AF operation using a so-called climbing method is carried out so that a high-frequency component (AF evaluation value) that has been extracted from image data becomes a maximum. It is also possible to carry out an automatic focusing operation using phase difference AF.

Once photometry and AF have been carried out, it is next determined whether or not the first release switch is off (S23). There will be cases where, after the photographer has pressed the release button down halfway, as shooting preparation, the finger is taken off the release button and the shooting preparation operation is stopped. Here the operation switch detection circuit 129 detects the operating state of the first release switch, and determination is carried out based on the result of this detection. If the result of this determination is that the first release switch is off, processing advances to step S41, which will be described later.

On the other hand, if the result of determination in step S23 is that the first release switch is not off, namely that it is on, it is next determined whether or not the second release switch is on (S25). If the photographer monitors the live view display and has determined composition and shutter timing, the release button is pressed down fully and execution of shooting is instructed. Here the operation switch detection circuit 129 detects the operating state of the second release switch, and determination is carried out based on the result of this detection. If the result of this determination is that the second release switch is off, step S23 is returned to.

If the result of determination in step S25 is that the second release switch is on, there is a transition to a shooting operation. First, imaging is carried out (S27). Here, the body CPU 121 performs communication with the lens CPU 221 based on results of the exposure calculation that was calculated in step S21, instructs a stopping down operation of the aperture 205, and after the stopping down operation is complete controls the image sensor 103 and the focal plane shutter 104 using the image sensor control circuit 124 and the shutter control circuit 126, to carry out a shooting operation After completion of the shooting operation, image data is acquired by subjecting image signals that have been read out from the image sensor 103 to processing by the image processing circuit 127.

Once imaging has been carried out, storage of image data is next carried out (S29). Here, the body CPU 121 stores image data that was acquired in step S27 in the RAM 123 or and external storage memory such as CompactFlash (registered trademark). Also, based on the acquired image data, that taken image is displayed on a display monitor by means of a display circuit 127 for a specified period.

If the result of determination in step S17 was that the movie switch was on, movie shooting mode is entered. First, movie shooting is commenced (S31). The body CPU 121 commences movie shooting by causing the image sensor 103 to be driven every synchronization period by the image sensor control circuit 124. Image signals that are output from the image sensor 103 are subjected to image processing for a movie by the image processing circuit 127, and storage of this movie image data in the RAM 123 or an external storage medium such as CompactFlash (registered trademark) is commenced.

Once movie shooting has commenced, MF ring operation detection and operation processing are carried out (S33). Here, as in step S15, operation control and setting processing for the focusing lens 203 is carried out according to the operating state of the MF ring 204.

Once MF ring operation detection and operation processing has been carried out, next movie photometry and AF are carried out (S35). As AE for movie shooting, control is carried out to drive the aperture 205 using the aperture drive circuit 227 in a drive step that is finer than at the time of still picture shooting, so that variation in subject light amount incident on the image sensor 103 becomes uniform. Also, in the case of AF mode, AF for movie shooting involves carrying out a climbing AF operation, and execution of a so-called wobbling operation where the focusing lens 203 is finely driven back-and-forth close to an in-focus state, as required.

Once Movie photometry and AF operation have been carried out, it is next determined whether or not the movie switch is off (S37). When the photographers finishes the movie shooting, a finger is taken off the movie button, and so here the operation switch detection circuit 129 detects the operating state of the movie switch, and determination is carried out based on the result of this detection. If the result of determination is that the movie switch is on, step S33 is returned to and movie shooting continues.

If the result of determination in step S37 is that the movie switch is off, movie shooting completion processing is carried out (S39). Here, the body CPU 121 finishes movie shooting by causing the image sensor 103 to stop operation using the image sensor control circuit 124.

Once storage of image data has been carried out in step S29, or movie shooting completion has been carried out in step S39, or if the result of determination in step S23 is that the first release switch is off, display initialization is next carried out (S41). Here, the body CPU 121 carries out clearing of taken image display or display of movie shooting parameters etc. using the display circuit 127, and returns display on the display monitor 105 to live view display. Once display initialization has been carried out, processing returns to step S9.

Next, MF ring operation detection and operation processing in steps S15 and S33 will be described using the flowchart shown in FIG. 10. Operations in the flow for MF ring detection and operation processing are executed by the lens CPU 221 under the control of the body CPU 121, but when RF mode is executed main execution is by the lens CPU 221. If the flow for MF ring operation detection and operation processing is entered, first, it is determined whether or not the MF ring 204 is at the RF position (S51). Here, position of the MF ring 204 is detected by the MF ring position detection circuit 224, and whether or not the MF ring 204 is at the RF position (range focus position, second position) is determined based on the result of this detection.

If the result of determination in step S51 is that the MF ring 204 is at the RF position, a range index setting flag is set at time L1 (S53). The time L1, as was described using FIG. 7, is a time for transmitting a lens communication synchronization signal from the camera body 100 to the interchangeable lens 200. Also, the range index setting flag is a flag indicating that the MF ring 204 has been slid to the RF position and RF mode has been set.

It is then determined whether or not focus setting is AF (S55). With this embodiment, focusing of the interchangeable lens 200 is carried out in AF mode, MF mode, or RF mode, as was described previously, and of these AF mode and MF mode are set on menu screens that are displayed on the display monitor 105 of the camera body 100. In this step, it is determined whether or not AF mode has been set on the menu screen. Since there are cases where the photographer has not set a focusing mode, one of the modes is set as the default.

If the result of determination in step S55 is that AF mode has been set, receipt of lens control commands is stopped (S57). Since RF mode was set in previously described step S51, then the interchangeable lens 200 is set so as to not receive lens control commands, even if lens control commands are transmitted from the camera 100 to the interchangeable lens 200. It is made possible for the camera body 100 to receive information such as a lens position acquisition signal from the interchangeable lens 200. By acquiring lens position information, it is possible, in control of the strobe unit 106, to carry out emission amount control etc. taking into consideration distance information.

If the result of determination S55 is that the focus setting is not AF mode, the rotation detection sensor of the MF ring 204 is turned off (S59). The result of determination in step S55 is that MF mode has been set at the camera body 100 side. However at the interchangeable lens 200 the MF ring 204 is at the RF position (second position) and RF mode has been set, and so it is not necessary to detect the rotation state even if the MF ring 204 has been subjected to a rotation operation. The sensor for rotation detection of the MF ring 204, namely the photo interrupter 225a (refer to FIG. 5), is then turned off.

Next, MF timer processing is carried out (S61). Here, timer processing is carried out in order to measure the slits/holes 204c of the MF ring 204, based on output from the photo interrupter 225a. MF timer processing will be described later using FIG. 11.

Once MF timer processing has been carried out, next, rotation detection of the MF ring 204 is stopped (S63). A sensor for detection is turned off in step S59, and since a timer for rotation detection is finished in step S61, in this step a rotation detection operation for the MF ring 204 is stopped.

If receipt of lens control commands has been stopped in S57, and MF ring rotation detection stop has been carried out in step S63, readout of RF setting position is next carried out at time L1 (S65). Here, as was described using FIG. 6, the distance scale 24a for the index 25a is read by the encoder section 226a. At the time of this reading by the encoder section 226a, a lens communication synchronization signal is used as a timing signal for the detection timer. The lens communication synchronization signal is in synchronization with a frame at the time of imaging by the image sensor 103, and is faster than the built-in timer of the lens CPU 221. As a result, even if a timer counter is not added, it is possible to use a lens communication synchronization signal as a high-speed counter at the time of reading the encoder section 226a. This read RF setting value can also be stored in flash ROM inside the interchangeable lens 200, and it is also possible, for example, to use a preset value of drive position to the range index position to be executed by an operation on the camera body.

If the RF setting position has been read out, lens drive to the RF setting position is next carried out (S67). Here, the lens CPU 221 drives the focusing lens 203 so as to focus at a distance corresponding to the RF setting position that was read out in step S65. In this step S67 also, by using the lens communication synchronization signal, it is possible to carry out drive control of the focusing lens 203 at high speed, and it is possible to rapidly carry out focusing to a set position after the photographer has rotated the MF ring 204 to the RF setting position.

If the result of determination in step S51 is that the MF ring 204 is not at the RF position, the range index setting flag is cleared at time L1 (S71). If the MF ring 204 is not positioned at the RF position (second position), release of RF mode is carried out, and the range index setting flag that was set in step S53 is cleared.

Then, as in step S55, it is determined whether or not focus setting is AF mode (S73). If the result of this determination is that AF mode has been set, receipt of lens control commands is commenced (S75). Since RF mode was set not in previously described step S51, then the lens CPU 221 of the interchangeable lens 200 is set so as to receive lens control commands, when lens control commands are transmitted from the camera 100 to the interchangeable lens 200.

On the other hand, if the result of determination in step S73 was that AF mode was not set, namely that MF mode was set, the rotation detection sensor of the MF ring 204 is next turned off (S77). In the case where MF mode is executed as the focusing mode, rotation states such as rotation direction, rotation amount, and rotation speed of the MF ring 204 are detected, and the lens CPU 221 drives the focusing lens 203 in accordance with the detection results. In this step, the sensor for detecting rotation state of the MF ring 204, namely the photo interrupter 225a (refer to FIG. 5), is turned off.

Once the MF ring 204 rotation detection sensor has been turned off, next, MF timer processing is carried out (S79). Here, timer processing for rotation detection of the MF ring 204 is carried out. At this time, compared to RF setting, since the need to read out at high speed is low, time counting is carried out with the timer that is built into the lens CPU 221. Detailed operation of this MF timer processing will be described later using FIG. 11.

Once MF timer processing has been carried out, next, rotation detection of the MF ring 204 is commenced (S81). Output of the photo interrupter 225a varies in accordance with movement of the slit holes 204c that rotate integrally with the MF ring 204, and so rotation state of the MF ring 204 is detected based on output of the photo interrupter 225a. The lens CPU 221 carries out drive control of the focusing lens 203 based on this detected rotation state.

If MF ring rotation detection has commenced in step S81, or if reception of lens control signals has commenced in step S75, or if a lens drive to the RF setting position has been carried out in step S67, MF ring operation detection and operation processing is completed and processing returns to the original processing flow.

Next, detailed operation of the MF timer processing in steps S61 and S79 will be described using the flowchart shown in FIG. 11. This MF timer processing executes timer processing for a timer counter to count clocks that are generated within the interchangeable lens 200, when detecting rotation state such as rotation direction, and rotation speed of the MF ring 204.

Figure 11:
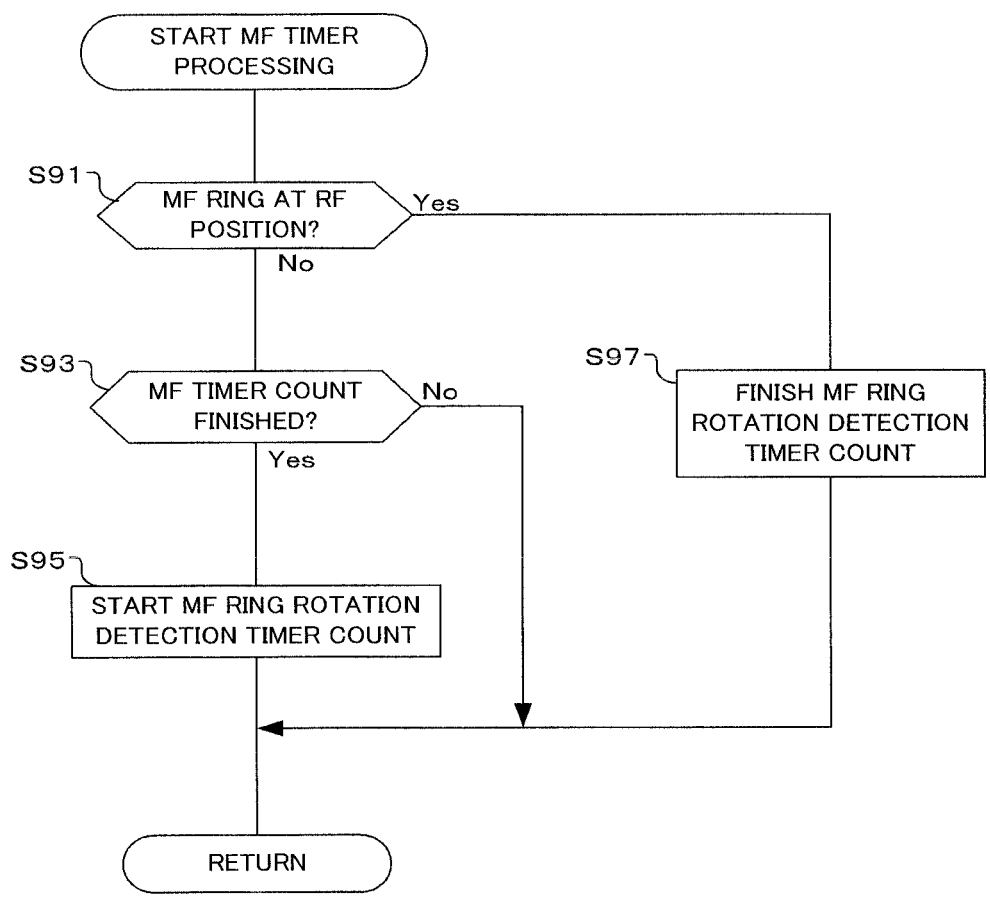
FIG. 11 is a flowchart showing MF timer processing of the camera of the first embodiment of the present invention.

If the flow for MF timer processing shown in FIG. 11 is entered, first, as with step S51, it is determined whether or not the MF ring 204 is at the RF position (S91). Here, it is detected whether or not it is the RF position (range focus position, second position) based on the result of position detection of the MF ring 204.

If the result of determination in step S91 is that the MF ring 204 is not at the RF position, it is determined whether or not counting of the MF time a counter has been completed (S93). The subsequent MF timer count is commenced in step S95, but it is determined whether or not this MF timer count has been completed. If the result of this determination is that the MF timer count has been completed, timer count for MF ring 204 rotation is commenced (S95). This MF timer count is a counter that uses a clock of the lens CPU, within the lens CPU 221.

If the result of determination in step S91 is that the MF ring 204 is at the RF position, MF ring 204 rotation detection timer count is completed (S97). If the MF ring 204 is at the RF position, focusing of the focusing lens 203 to a position corresponding to the absolute distance shown by the MF ring 204 is carried out by the encoder section 226a (refer to FIG. 6), and relative rotation amount of the MF ring 204 is not detected. The MF ring 204 rotation detection timer count is then completed.

If the timer count of step S95 is commenced, or if the result of determination in step S93 is that the MF timer count has not been completed, or if the timer count has been completed in step S97, MF timer processing is completed and the original processing flow is returned to.

Figure 12:
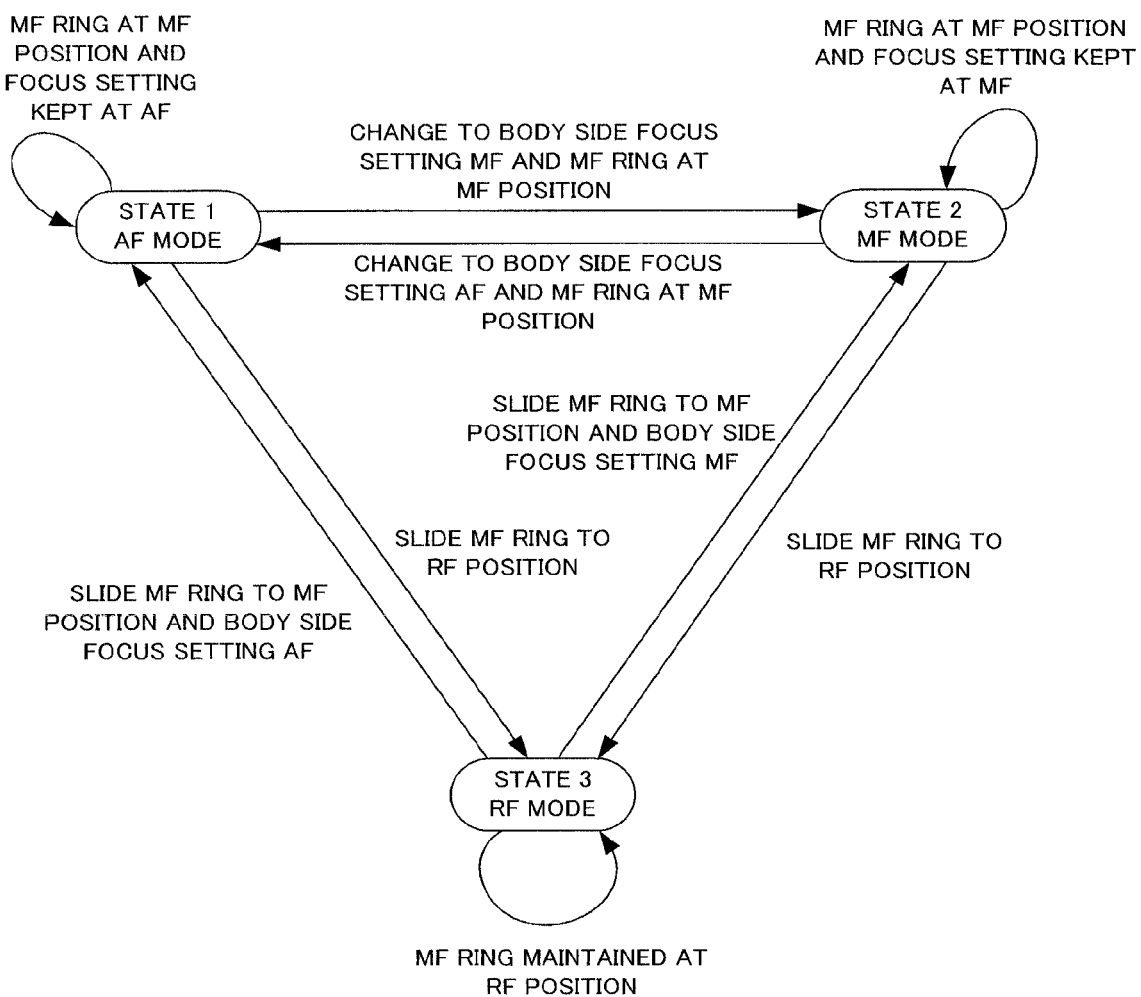
FIG. 12 is a state transition diagram for auto focus (AF) mode, manual focus (MF) mode, and range focus (RAF) mode, in a camera of the first embodiment of the present invention.
Figure 13:
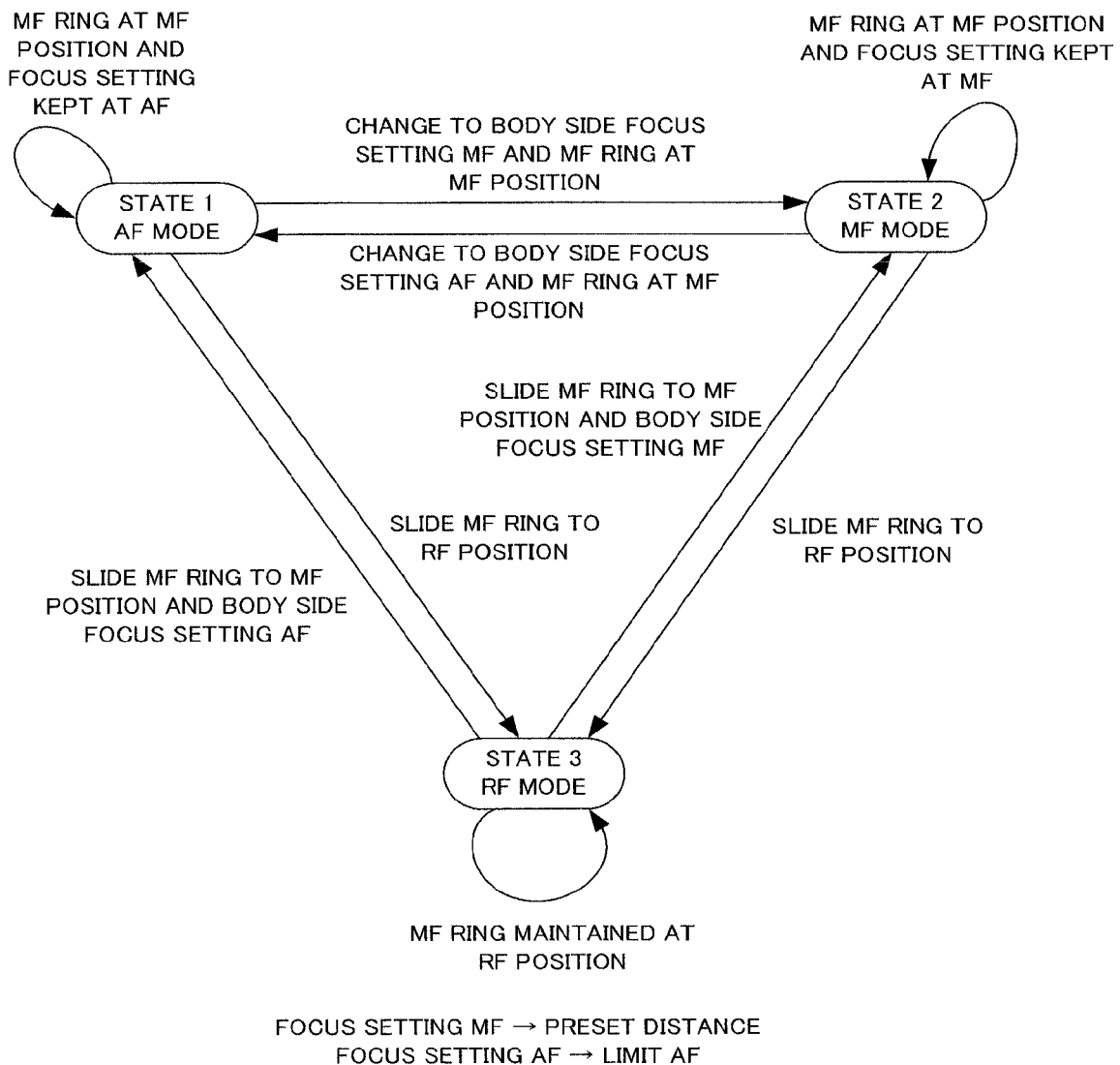
FIG. 13 is a state transition diagram for auto focus (AF) mode, manual focus (MF) mode, and range focus (RAF) mode, in a camera of a second embodiment of the present invention.

Therefore, with the first embodiment of the present invention, there are 3 modes for focusing, namely AF mode, MF mode, and RF mode. Switching of these 3 modes will be described using FIG. 12. In FIG. 12, state 1 is AF mode, state 2 is MF mode, and state 3 is RF mode. Of these states, AF mode and MF mode are set on menu screens of the camera body 100, as was described previously, and RF mode can be set by performing a sliding movement of the MF ring 204 of the interchangeable lens 200 to the second position.

The AF mode of state 1 remains in AF mode if the MF ring 204 is at the MF position (first position) and AF mode is still set as the focusing setting on the menu screen of the camera body 100. The MF mode of state 2 remains in MF mode if the MF ring 204 is at the MF position (first position) and MF mode is still set in the camera body 100.

In switching from AF mode of state 1 to MF mode of state 2, the focusing setting should be changed to MF mode at the camera body 100 with the MF ring 204 kept at the MF position (first position). Conversely, in switching from MF mode to AF mode, the focusing setting should be changed to AF mode with the MF ring 204 kept at the MF position (first position).

In switching from the AF mode of state 1 to the RF mode of state 3, all that is required is a slide operation of the MF ring 204 to the RF position (second position), and it is not necessary to change the focusing setting in the camera body 100. Conversely, in switching from the RF mode of state 3 to the AF mode of state 1, a slide operation of the MF ring 204 to the MF position (first position) is carried out, together with changing of the focusing setting in the camera body 100 to AF mode.

In switching from the MF mode of state 2 to the RF mode of state 3, all that is required is a slide operation of the MF ring 204 to the RF position (second position), and it is not necessary to change the focusing setting in the camera body 100. Conversely, in switching from the RF mode of state 3 to the MF mode of state 2, a slide operation of the MF ring 204 to the MF position (first position) is carried out, together with changing of the focusing setting in the camera body 100 to MF mode.

As has been described above, with the first embodiment of the present invention, there are three focusing modes of AF mode, MF mode, and RF mode, and among these three modes AF mode and MF mode must be set at the camera body 100, while having the MF ring 204 that is provided on the interchangeable lens 200 set to the first position. On the other hand RF mode is capable of being set by simply setting the MF ring 204 provided on the interchangeable lens 200 to the second position, regardless of the focusing mode setting in the camera body 100. Conventionally, with a camera fitted with an interchangeable lens, it was general practice to have a relationship where the camera was the master device and interchangeable lens was the slave. With this embodiment however if RF mode is set on the interchangeable lens, the interchangeable lens becomes the master device with respect to focusing. As a result it is possible to carry out focusing in RF mode rapidly. Specifically, it is possible to automatically switch the focusing mode by operating the ring member (MF ring) provided on the interchangeable lens.

Also, with the first embodiment of the present invention, the MF ring 204 as the ring member is capable of two operations, namely a rotation operation and a slide operation. Manual focusing when in MF mode and distance setting when in RF mode are therefore possible with the rotation operation, and RF mode setting is possible using a slide operation. This means that the photographer can rapidly carry out switching of focusing modes and distant setting by simply operating the MF ring 204 while concentrating on the viewfinder etc.

Also, in the first embodiment of the present invention, the MF ring 204, as the ring member, constitutes, at the first position, a manual focusing member at the time of MF mode, or at the second position constitutes a distant setting member at the time of RF mode. It is therefore possible to have a single ring member act as an adjustment member having two functions, and it is possible to reduce the size.

With the first embodiment of the present invention, both AF mode and MF mode are switched at the camera body 100, but the focusing modes at the camera body 100 side are not limited to two modes, and it is also possible to provide other focusing modes, and it is also possible to only provide one or the other of the AF mode and the MF mode.

Also, with the first embodiment of the present invention, the MF ring 204, as the ring member, has been moved between two positions, namely a first position and a second position, but it is also possible to provide other positions, such as a third position.

Next, a second embodiment of the present invention will be described using FIG. 13 to FIG. 18. The second embodiment, when the ring member is at the second position, carries out focusing of the focusing lens 203 in limited AF mode, using a preset distance. In this case, it is possible to set the AF range using the preset distance.

The structure of the second embodiment is similar to structure shown in FIG. 1 to FIG. 6 for the first embodiment, and so detailed description will be omitted. Also, synchronous communication between the interchangeable lens and the camera body is the same as in FIG. 7, and so detailed description will be omitted.

An automatic focus control section for carrying out automatic focusing of the focusing lens 203 is constituted by the image processing circuit 127, body CPU 121, lens CPU 221, lens drive circuit 222 etc. This automatic focusing section performs switching of focusing mode based on position in the slide direction that has been determined by the slide position determination section, and automatically performs focusing of the focusing lens 203 at either the first position or the second position using a preset distance. The preset distance is used to limit the focusing range of the focusing lens 203 based on a preset distance that has been set.

Also, the MF ring 204 functions as a ring member arranged to rotate with respect to a lens barrel, and to slide to a first position and a second position. The MF ring position detection circuit 224 functions as a slide position determination section for determining position of the ring member (MF ring 204) in the slide direction.

Also, the index position detection circuit 226 detects changes in connection state between the code patterns 226b and the contact point section 226c, and detects absolute rotational position, namely preset position (preset distance), of the MF ring 204 about the optical axis O. This preset distance corresponds to a distance at which the photographer aligns display of the distance display ring 24 that rotates integrally with the MF ring 204 with the index 25a. Specifically, the index detection circuit 226 functions as a preset distance determination section for determining a preset distance that has been set based on position of the ring member in the rotation direction.

Also, the image sensor control circuit 124 and the image sensor 103 function as an imaging section for forming a subject image. Also, the display circuit 128 and the display monitor 105 function as a display section for displaying a subject image based on image data that has been formed by the imaging section. A set preset distance and a focus limit range are displayed on this display section.

Next, operation of the second embodiment of the present invention will be described. First, state transition for autofocus (AF) mode, manual focus (MF) mode, and range focus (RAF) mode, will be described using FIG. 16.

Compared to the transition of mode states of the first embodiment that was shown in FIG. 12, the mode state transition of this embodiment is different in the operation for the RF mode of state 3. If the MF ring 204 is at the RF position, RF mode of state 3 is set. RF mode is execution of normal RF mode in which a preset distance is set by rotating the MF ring 204 and aligning the distance scale 24a of the distance display ring 24 with the index 25a, and focusing is carried out to this preset distance, as was described using FIG. 8, if MF mode is set at the camera body 100 side. Also, if AF mode is set at the camera body 100, limit AF is executed to limit the scan range for AF detection. Switching of the other modes is the same as for the first embodiment, and so detailed description will be omitted Next, a shooting operation of the second embodiment of the present invention will be described using the flowcharts shown in FIG. 14 to FIG. 16. The content of this flowchart, as with the first embodiment, is mainly executed by the body CPU 121 in accordance with programs stored in the flash ROM 122 within the camera body 100, with some content, when RF mode has been set during the flow for MF ring operation detection and operation processing, is mainly executed by the lens CPU 221 in accordance with programs stored in the flash ROM within the interchangeable lens 200.

First, the main flow for the shooting operation of the second embodiment is the same as the flowchart shown in FIG. 9, and so detailed description will be omitted. In the MF ring operation detection and operation processing of step S15 in FIG. 9, if the MF ring 204 has been slid to the rear of the interchangeable lens 200 (towards the imaging surface) and is at the second position, then if AF mode has been set in the camera body 100 the previously described limit scan AF is executed, while if MF mode has been set then RF mode to focus to the preset distance is executed. Detailed processing of the MF ring operation detection and operation processing will be described later using FIG. 14. Also, detailed processing for still picture photometry and AF in step S21 will described later using FIG. 15. Detailed processing for movie photometry and AF in step S35 will also be described later using FIG. 16.

Next, MF ring operation detection and operation processing in steps S15 and S33 (refer to FIG. 9) will be described using the flowchart shown in FIG. 14. Operations in the flow for MF ring detection and operation processing are executed by the lens CPU 221 under the control of the body CPU 121, but when RF mode is executed main execution is by the lens CPU 221. If the flow for MF ring operation detection and operation processing is entered, first, slide position detection is carried out (S151). Here, the MF ring position detection circuit 224 detects position of the MF ring 204, namely whether it is at the first position or at the second position.

If slide position detection has been carried out, it is next determined whether or not the MF ring 204 is at the RF operation position, namely at the second position (S153). If the result of this determination is that the MF ring 204 is at the RF operation position (second position), detection of preset position is carried out (S155). Here, as described previously, a preset position corresponding to a distance scale of the distance display ring 24 that rotates integrally with the MF ring 204 that aligns with the index 25a is detected based on detection by the encoder section 226a of the index position detection circuit 226. Also, if the preset position has been set, preset distances 311a-311c (refer to FIG. 18A to FIG. 18C) corresponding to the preset position are displayed on the display monitor 105.

Once preset position has been detected, lens drive (LD) to the preset position is carried out next (S157). Here, the focusing lens 203 is driven by the lens drive circuit 222 a preset distance corresponding to the preset position that was set in step S155. Also, at the time of driving the image processing circuit 127 acquires an AF evaluation value. Here, acquiring the AF evaluation value is in order to carry out determination of drive direction at the time of lens drive in the case where AF mode has been set.

Once lens drive to the preset position has been carried out, it is determined whether or not AF mode has been set (S159). As described previously, AF mode and MF mode are set on menu screens of the camera body 100, and so in this step determination is made based on setting conditions on the menu screens. If the result of this determination is that MF mode as been set, then since normal RF mode for driving the focusing lens 203 to the preset distance has been completed, the original processing flow is returned to. On the other hand, if the result of determination is that AF mode has been set, then control using limited AF is carried out in step S159 and after.

If the result of determination in step S159 is that AF mode has been set, then in order to carry out limit AF, confirmation of MF ring rotation operation history is first carried out (S161). In step S181, which will be described later, rotational direction of the rotation operation of the MF ring 204 is detected, and rotation direction that this time is stored as rotation operation history. In step S161, the rotation operation history is referenced, and direction of a rotation operation of the MF ring from immediately prior to the time when it was detected that the MF ring 204 had been slid to the second position in order to carry out limit AF until a specified time, for example one second, is determined.

Specifically, with this embodiment, in carrying out limit AF, first, with the MF ring 204 at the first position (MF position), the MF ring 204 is slid to the second position (RF position) with either a rotation operation in a clockwise direction or an anticlockwise direction, or without a rotation operation. This rotational direction immediately prior to the slide operation is stored as the MF ring rotation operation history. In steps S161 to S171 a scan range for AF detection is limited based on the rotation operation history that was read out in step S161.

Once history of the MF ring rotation operation has been confirmed in step S161, it is next determined whether or not there was rotation in a clockwise direction before the slide operation of the MF ring 204 (S163). Here, determination is based on the MF ring rotation operation history that was confirmed in step S161.

If the result of determination in step S163 is that there was rotation in the clockwise direction before a slide, from the current position to the infinity end is set as the AF range (S171). In this embodiment, rotation of the MF ring 204 in the clockwise direction is an operation toward the infinity end. Here, the MF ring 204 remains at the preset position that was driven to in step S157. Accordingly, in this step the AF range when focusing a climbing method is set from the preset position to the infinity end.

On the other hand, if the result of determination in step S163 is that there is not rotation in the clockwise direction before the slide, it is next determined whether or not there was rotation in the anticlockwise direction before the slide (S163). Here, determination is based on the MF ring rotation operation history that was confirmed in step S161.

If the result of determination in step S163 is that there was rotation in the anticlockwise direction before a slide, from the current position to the close-up end is set as the AF range (S169). In this embodiment, rotation of the MF ring 204 in the anticlockwise direction is an operation toward the close-up end. Also, the current position was driven to the preset position in step S157. Accordingly, in this step the AF range when focusing a climbing method is set from the preset position to the close-up end.

If the result of determination in step S165 is that there was not rotation in the anticlockwise direction before a slide, in front of and behind the current position is set as the AF range (S167). This case is a case where there was no rotation of the MF ring 204 before sliding of the MF ring 204. In this case, the AF range is set within a specified range in front of and behind the preset position (current position) driven to in step S157.

As the specified range there is, for example, (1) a range in which it is possible to execute with an AF time of 100 ms or less. It is possible to determine a distance range from a scan speed when scanning the focusing lens 203 using a climbing method. Also, as the specified range there is, for example, (2) a range of double the depth of field. Depth of field is determined in accordance with the aperture 205 and focal length of the interchangeable lens, and it is possible to determine a distance range of twice this depth of field. Also, as the specified range there is, for example, (3) a range that has been specified by the photographer on a menu screen.

If the result of determination in step S153 is that the MF ring 204 is not at the RF operation position (second position), detection of MF ring rotation operation is carried out (S181). When the MF ring 204 is not at the RF operation position, it is at the MF position (first position). In this case, if MF mode it has been set at the camera body 100, manual focus is executed to manually carry out focus, or if AF mode has been set, autofocus is executed to automatically carry out focus using a climbing method.

In step S181, rotation states such as rotation direction rotation amounts and rotational speed of the MF ring 204 are detected by the MF position detection circuit 225. Also, as described previously, the rotation direction at this time is temporarily stored as rotation operation history.

Once MF ring rotation operation detection has been carried out, it is next determined whether or not it is MF mode (S183). As described previously, MF mode and AF mode are set at the camera body 100, and so in this step determination is made based on setting conditions.

If the result of determination in step S183 is that MF mode has been set, it is next determined whether or not there has been a rotation operation (S185). Here, determination is carried out based on a detection result for MF ring operation in step S181.

If the result of determination in step S185 is that there has been a rotation operation, next, the focusing lens 203 is driven in accordance with rotation amount and direction (S187). Specifically, the lens drive circuit 222 performs drive of the focusing lens 203 in accordance with rotation amount and rotation direction that were detected in step S181.

Once drive of the focusing lens has been carried out, MF ring rotation operation detection is carried out (S189). Here, rotation state of the MF ring 204 is detected by the MF position detection circuit 225. Next, it is determined whether or not the rotation operation has stopped (S191). Here, determination is performed based on detection results in step S189, and if the result of this determination is that the rotation operation has not stopped, processing returns to step S187, and the focusing lens 203 is driven based on the result of detection in step S189.

If the result of determination in step S191 is that the rotation operation has stopped, or if the result of determination in step S185 was that there was no rotation operation, or if the result of determination in step S183 was that it was not. MF mode (namely that it was AF mode), or if the result of determination in step S159 was that AF mode was not set (namely that it was MF mode), or if AF range setting has been carried out in steps S167 to S171, the original processing flow is returned to.

In this way, in the flow for MF ring operation detection and operation processing, if the MF ring 204 is at the MF position (S153→No), rotation state of the MF ring 204 is detected and rotation direction is stored (S181), and if it is MF mode (S183→Yes) focusing is carried out using manual focus (S185 to S191), while if it is AF mode (S183→No) focusing is executed by autofocus using a climbing method. Also, if the MF ring 204 is at the RF position (S153→Yes), focusing RF mode, namely focusing to a preset distance, is carried out (S155, S157), and if it is AF mode an AF range limit is set for limit AF (S161 to S171). In this case, if MF mode has been set, the AF range is not limited. After limit AF has been executed at the RF position, if the MF ring 204 has been slid to the MF position focusing is carried out in normal AF mode regardless of a set preset distance.

Also, when limiting AF range at the time of limit AF, limiting of the AF range is performed in accordance with rotation direction of the MF ring 204 immediately before movement of the MF ring 204 to the RF position (second position), and the preset position. Specifically, the automatic focus control section constituted by the image processing circuit 127 and the lens drive circuit 222 sets a range for limiting focus (AF range) based on the preset distance (distance corresponding to the preset position) and rotation direction of the ring member (MF ring 204). As a result, for example, after the photographer has rotated the MF ring 204 in a direction corresponding to a distance to the subject they want to focus on, automatic focusing is carried out by simply sliding the MF ring 204 to the RF position.

Next, display on the display monitor 105 at the time of the MF ring operation detection and operation will be described using 18A to 18C. Specifically, if an AF range has been set in steps S167 to S171, the set range is subjected to live view display on the display monitor 105, and display such as is shown in 18A to 18C is performed. In 18A to 18C, a subject is displayed in live view on an enlarged part of the screen of the display monitor 105, and the range of limit AF is displayed in a strip at an upper part of the screen. A close-up distance (0.2 m in the illustrated example) is displayed at the left end of the strip section, while a distance of infinity is displayed at the right end. The display region for the strip shape is not limited to the upper part of the screen and is also not limited to a strip shape.

In the case where an AF range from the current position to the infinity end has been set in step S171, then as shown in 18A, a preset distance 311a (5 m in the illustrated example) corresponding to the preset position is displayed enclosed in a black frame, and from the preset distance 311 to the infinity end is displayed with shading in order to show that it is the AF range 313a. The black frame display and shaded display is only an example, and this display is not limited as long as it is discernible (the same also applies to FIG. 18B and FIG. 18C).

Figure 18A:
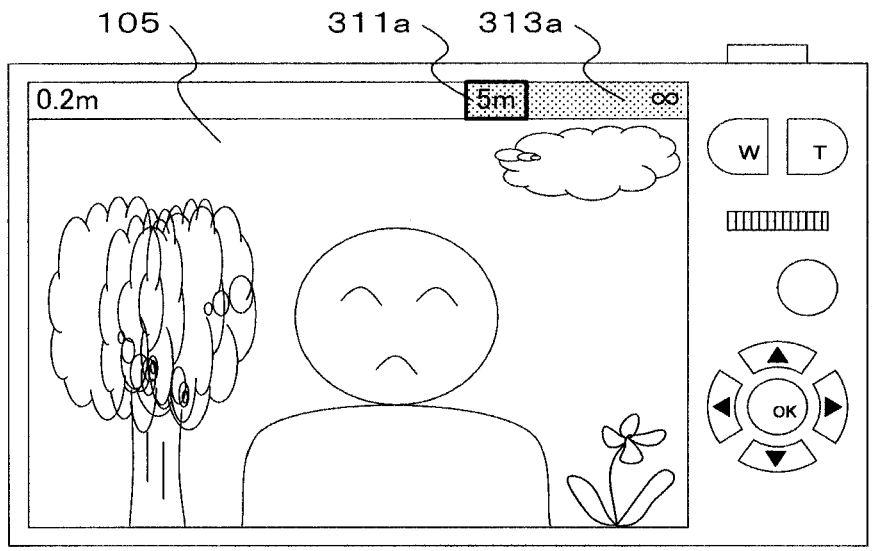
FIG. 18A-FIG. 18C are diagrams showing display states on a display section at the time of a limit AF operation, for setting a preset distance and limiting a range to be scanned, in the camera of the second embodiment of the present invention.
Figure 18B:
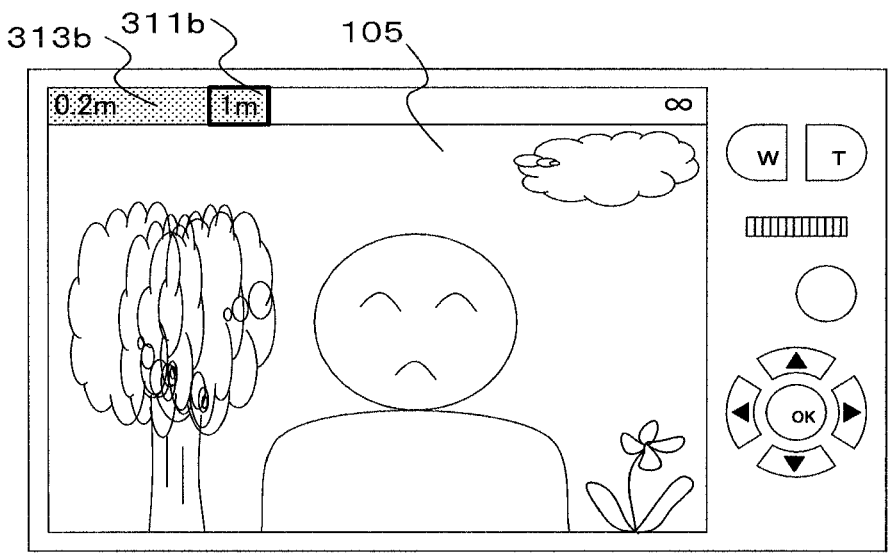
Figure 18C:
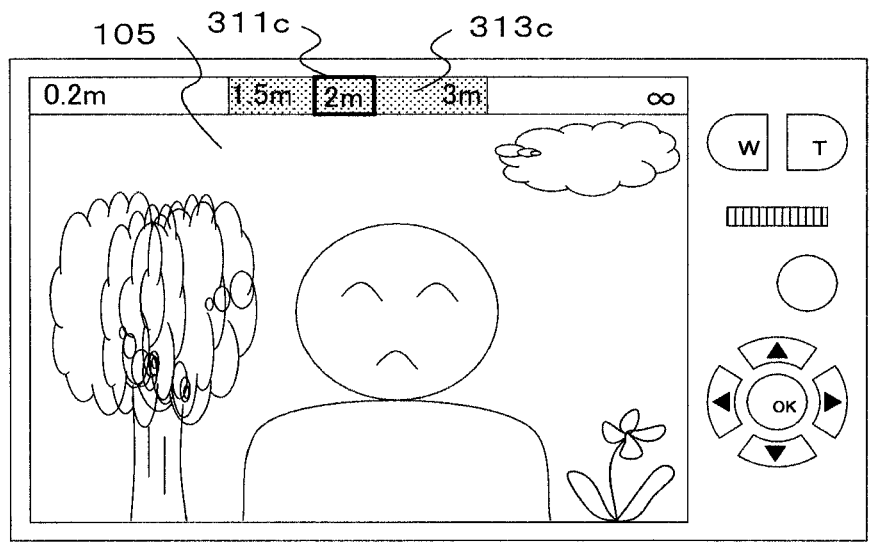

If the AF range has been set from the current position to the close up end in step S169, the preset distance 311b (1 m in the illustrated example) corresponding to the preset position is displayed, and from the preset distance 311 to the close-up end is displayed as the AF range 313b, as shown in FIG. 18B. Also, as shown in 18C, if in front of and behind the current position has been set as the AF range in S167, a preset distance 311c (2 m in the illustrated example) corresponding to the preset position is displayed, and the AF range 313c is displayed in front of and behind the preset distance 311.

Next, operation for still picture photometry and AF in step S21 will be described using the flowchart shown in FIG. 15. If the flow for still picture photometry and AF is entered, first, direction determination for commencement of scan drive is carried out (S201). At the time of normal AF, an AF evaluation value is acquired while carrying out lens drive in a specified direction, for example, towards whichever of the infinity end or the close-up end is closer, with respect to the current position of the focusing lens 203. A direction in which this acquired AF evaluation value increases is made the scan drive start direction.

However, at the time of the processing of step S201, if the MF ring 204 is at the RF position (second position) indicating RF mode and the body side has been set to AF mode, if it is within a specified time, for example one second or less, from detection of slide of the MF ring 204 in step S151 (refer to FIG. 14), the drive start direction is set based on AF evaluation value that was acquired at the time of scan drive towards the preset position in step S157. If the specified time or greater has elapsed from the slide detection in step S151, then in the case where a determination of drive direction using the AF evaluation value that was acquired in step S157 is impossible, the scanned drive start direction is made towards the infinity end when the AF range limit setting is towards the infinity end (refer to S171), towards the close up and when the limit setting is towards the close-up end (refer to S169), and in a direction determined by the same determination as at the time of normal AF when the limit setting is in front of and behind the preset position (refer to S167).

Figure 17A:
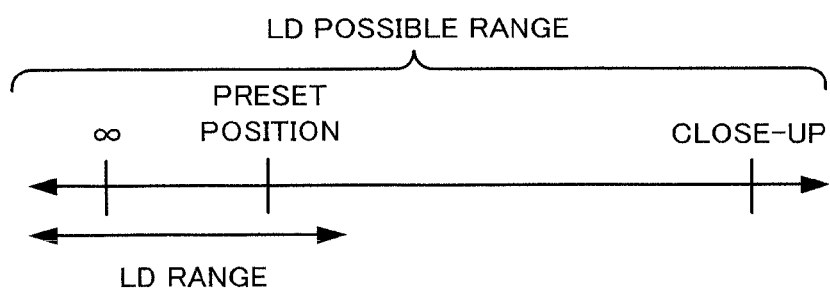
FIG. 17A-FIG. 17C are diagrams showing a range for limiting scan for focusing, in the camera of the second embodiment of the present invention.
Figure 17B:
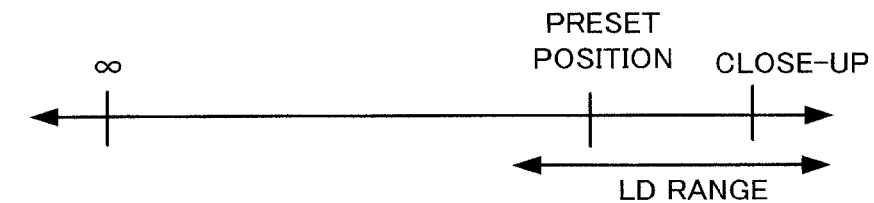
Figure 17C:
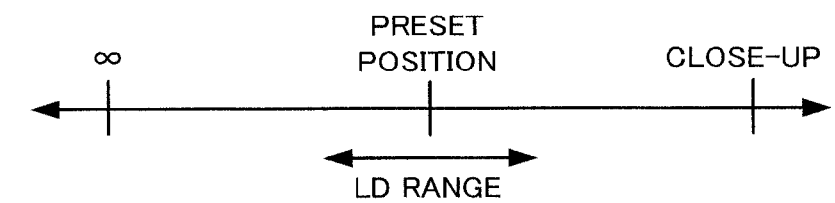

If direction determination has been carried out in step S201, next scan drive range is set and scanning is commenced (S203). Here, setting of scan drive range is carried out using the drive direction that was determined in step S201. The scan drive range will now be described using FIG. 17A-FIG. 17C. As described previously, in this embodiment automatic focusing is carried out with contrast AF using a climbing method. In FIG. 17A-FIG. 17C, an LD possible range represents a range where drive of the focusing lens 203 is possible.

In the case of limit AF where AF scan drive range has been limited, a set range that was limited in steps S167 to S171 (refer to FIG. 14) is added to a lens drive range for detecting a peak of AF evaluation value by driving the lens toward the close-up end and the infinity, to constitute a lens drive range (LD range). As a lens drive portion for carrying out peak detection, for example, it is preferable to have a range that makes it possible for AF evaluation value to be acquired a minimum of 2 times.

A lens drive range (LD range) for the case where an AF range was set from the preset position to the infinity end in step S171 is shown in FIG. 17A. Also, a lens drive range (LD range) for the case where an AF range was set from the preset position to the close up end in step S169 is shown in FIG. 17B. Also, a lens drive range (LD range) for the case where an AF range was set in front of and behind the preset position in step S167 is shown in FIG. 17C.

If the lens drive range for scanning has been set, the lens drive circuit 222 commences drive of the focusing lens 203 in the set lens drive direction while referencing detection results from the lens position detection circuit 223.

Imaging and acquisition of an AF evaluation value is then carried out (S205). Here, the image sensor control circuit 124 carries out control of the image sensor 103 to form a subject image, and the image processing circuit 127 acquires AF evaluation value. Lens position is also acquired (S207). Here, lens state data is acquired by synchronous communication.

Position of the focusing lens 203 at the time of imaging is acquired from this lens state data.

If lens position has been acquired, peak passing determination is next carried out (S209). AF evaluation value is acquired every time a single frame is imaged in step S205, and by detecting change from an increase to a decrease of this AF evaluation value it is determined whether or not a maximum value has been passed.

If peak passing determination has been carried out, it is next determined whether or not peak detection is unsuccessful (S211). Here, it is detected whether or not it was impossible to detect peak passing in step S209, even with scanning (even with lens drive) of the scan drive range that was set in step S203. During scan drive the determination result is No.

If the result of determination in step S211 is No, then it is next determined whether or not a peak was detected (S213). Here it is determined whether or not it was possible to detect peak passing in step S209. If the result of this determination is that peak detection was not possible, processing returns to step S205, and peak detection is carried out while continuing lens drive.

If the result of determination in step S213 is that peak detection was possible, then next focus position is calculated (S215). Focus position is calculated by a method such as interpolation calculation or quadratic approximation, using an AF evaluation value close to the maximum value of AF evaluation value for which a peak was detected in step S209. Once focus position has been calculated, lens drive to the focus position is carried out (S217). Here, the lens drive circuit 222 drives the focusing lens 203 towards the focus position that was calculated in step S215.

If the result of determination in step S211 was that peak detection was unsuccessful, it is next determined whether or not the MF ring 204 is at the RF position (second position) (S221). This state is when it was not possible to detect peak passing, regardless of peak detection of AF evaluation value having been carried out using limit AF. In this case, handling differs depending on whether or not the MF ring 204 is at the RF position (second position).

If the result of determination in step S221 is that the MF ring is at the RF position, drive of the focusing lens 203 to the preset position is carried out (S223). Since the MF ring 204 is at the RF position, the lens is driven to the preset distance at that time. Since it was not possible to detect a focus point within the set range, it is also possible to carry out warning display to indicate lack of focus on the display monitor 105.

On the other hand, if the MF ring 204 is not at the RF position, warning display is carried out (S225). Here since it was not possible to detect a focus point, warning display is carried out, such as flashing a focus mark.

If lens drive to the focus position has been carried out in step S217, or if lens drive to the preset position has been carried out in step S223, or if warning display has been carried out in step S225, imaging and acquisition of image data for photometry are carried out (S227). Here, imaging for photometry is carried out, and image data for photometry is acquired. Photometry calculation is then carried out (S229). Here, parameters such as shutter speed and aperture value for exposure control are calculated from the acquired image data. Once the photometry calculation has been performed, the original processing flow is returned to.

In this way, in the flow for still picture photometry and AF, when the MF ring 204 is at the RF position (second position) and AF mode has been set, limit AF is executed. In this case, a scan drive range is set (S203), and the focusing lens 203 is driven within this range to carry out focal point detection using a climbing method (S205-S213). Also, in the case where limits AF is carried out and a focus point can not be detected automatically, focusing is carried out to a preset distance that was set in RF mode (S223). Also, in the case where MF mode has been set in the camera body, processing from step S201 to S225 is omitted and steps S227 and S229 are executed.

Figure 16:
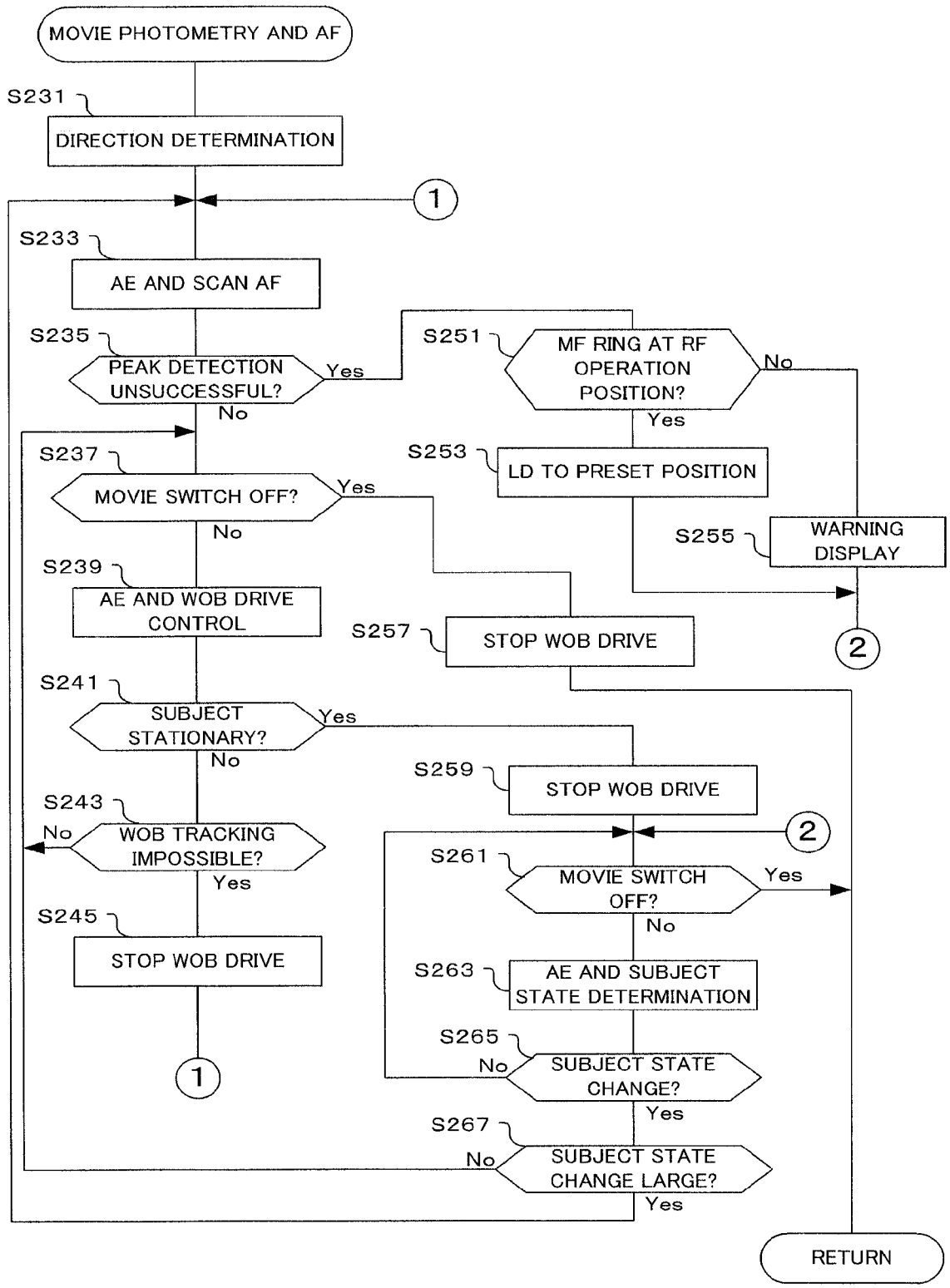
FIG. 16 is a flowchart movie photometry and AF processing for the camera of the second embodiment of the present invention.

Next, operation for still picture photometry and AF in step S35 will be described using the flowchart shown in FIG. 16. If the flow for still picture photometry and AF is entered, first, similarly to step S201, direction determination is carried out (S231).

Once direction determination has been carried out AE and scan AF are carried out (S233). Here, photometry calculation is carried out based on image data that has been output from the image sensor 103 in accordance with the imaging frame rate, and exposure control is carried out. Also, AF evaluation value is calculated based on the image data, and similarly to steps S203-S213 (refer to FIG. 15) a scan AF operation is executed based on this AF evaluation value. Scan AF, as described above, is setting a scan drive range and detecting a peek of AF evaluation value while driving in this range.

Once AE and scan AF have been carried out, it is next determined whether or not the detection was unsuccessful (S235). Here it is determined whether or not it was possible to detect peak passing within the scan drive range. If the result of this determination is that peak detection was not possible, it is next determined, similarly to step S221, whether or not the MF ring 204 is at the RF position (second position) (S251).

If the result of determination in step S251 is that the MF ring 204 is not at the RF position, warning display is carried out (S255), similarly to step S225. Here since it was not possible to detect a focus point, warning display is carried out, such as flashing a focus mark. On the other hand, if the MF ring is at the RF position, then similarly to step S223, the lens is driven a preset distance corresponding to the preset position (S253). Since it was not possible to detect a focus point within the set range, it is also possible to carry out warning display to indicate lack of focus on the display monitor 105.

If the result of determination in step S235 is that peak detection was possible, it is next determined whether or not a movie switch is off (S237). In previously described step S17 (FIG. 9), movie shooting is commenced if the movie switch being on is detected, and movie shooting is stopped by the photographer turning the movie switch off. Here, the operation switch detection circuit 129 detects the state of the movie switch, and the determination is carried out based on this detection signal.

If the result of determination in step S237 is that the movie switch is not off, next AE and Wob (wobbling) drive control is carried out (S239). Here, photometry calculation is carried out based on image data that has been output from the image sensor 103 in accordance with the imaging frame rate, and exposure control is carried out based on this photometry data. Also, AF evaluation value is acquired from the above-described image data while carrying out so-called wobbling drive to finely vibrate the focusing lens 203, and drive amount is controlled, based on AF evaluation value, so that a central position of the wobbling drive amplitude is made a position (focus position) where a maximum AF evaluation value is achieved.

In step S239, since the focusing lens 203 is driven within the lens drive range to a focus position using a climbing method, after that movie focusing is carried out using wobbling drive. With wobbling drive, all or some of the lenses of the focusing lens 203 are vibrated in the optical axis direction by the lens drive circuit 222. As wobbling drive, vibration is performed with a period of twice the frame rate, for example at 15 fps if the frame rate is 30 fps, and at an amplitude that encompasses the depth of field.

Once AE and Wob drive control has been carried out it is next determined whether or not the subject remains stationary (S241). Here, it is determined whether or not the subject is in a stationary state based on change in AF evaluation value that has been acquired in step S239. A stationary state is determined if there is no variation in the AF evaluation value.

If the result of determination in step S241 is that the subject is not stationary, it is next determined whether or not Wob tracking is impossible (S243). Here, it is determined whether or not tracking is possible with wobbling drive control based on variation in the AF evaluation value. If there is large variation in the AF evaluation value, it is determined that tracking is not possible. If the result of determination is that tracking is possible, processing returns to step S237, and focusing continues using Wob drive control.

If the result of determination in step S243 is that Wob tracking is impossible, Wob drive is stopped (S245). If Wob drive it stopped processing returns to step S233, and then, as was described previously, the focusing lens 203 is driven to the focus position while scanning within the lens drive range.

If the result of determination in step S241 is that the subject is stationary, Wob drive is stopped (S259). Since the subject is stationary, there is no need to carryout focusing wobbling drive. Next, similarly to step S237, it is determined whether or not a movie switch is off (S261).

If the result of determination in step S261 is that the movie switch is not off, next. AE and subject appearance determination are carried out (S263). Here, photometry calculation is carried out based on image data that has been output from the image sensor 103 in accordance with the imaging frame rate, and exposure control is carried out based on this photometry data. Also, AF evaluation value is acquired from the image data and it is determined, based on this AF evaluation value, whether or not there is change in the appearance of the subject. For example, variation in acquired AF evaluation value is continuously approximated using a least square method, and it is determined that the subject has changed in cases such as where variation in that AF evaluation value is larger than a determination level based on a level of variation in AF evaluation value in the case where a Seimens star chart is made a subject.

If the result of determination in step S265 is that the subject state is not changing, processing returns to step S261. Specifically, since the subject is in a stationary state AE is executed with AF with wobbling drive still stopped.

If the result of determination in step S265 is that the subject state has changed, it is next determined whether or not the subject state has changing significantly (S267). If the result of this determination is that there is not significant variation, processing returns to step S237 and focusing is carried out using AF with wobbling drive. On the other hand, if the subject state has changed significantly, processing returns to step S233 and the focusing lens 203 is driven to the focus position while scanning within the lens drive range. Accordingly, when determining whether or not there is significant change in subject state, it is only necessary to determine whether or not tracking is possible in AF using wobbling drive.

If the result of determination in step S237 is that the movie switch is off, Wob drive is stopped (S257). If wobbling drive is stopped in this step, or if the result of determination in step S261 is that the movie switch is off, the processing flow for movie photometry and AF is finished and the original processing flow is returned to.

In this way, in the flow for movie photometry and AF, when the MF ring 204 is at the RF position (second position) and AF mode has been set, limit AF is executed in step S203, similarly to the case for the processing flow for picture photometry and AF. Also, if the focus point is detected by scanning within the lens drive range, focus point is tracked after that using wobbling drive.

As has been described above, with the second embodiment of the present invention, when the MF ring 204 is at the RF position (second position) and AF mode has been set, a range in which scan AF is carried out is limited using a distance corresponding to the preset position. As a result, it is possible to carry out focusing rapidly by setting a preset distance in accordance with a distance to the main subject the photographer wants to focus on.

Figure 14:
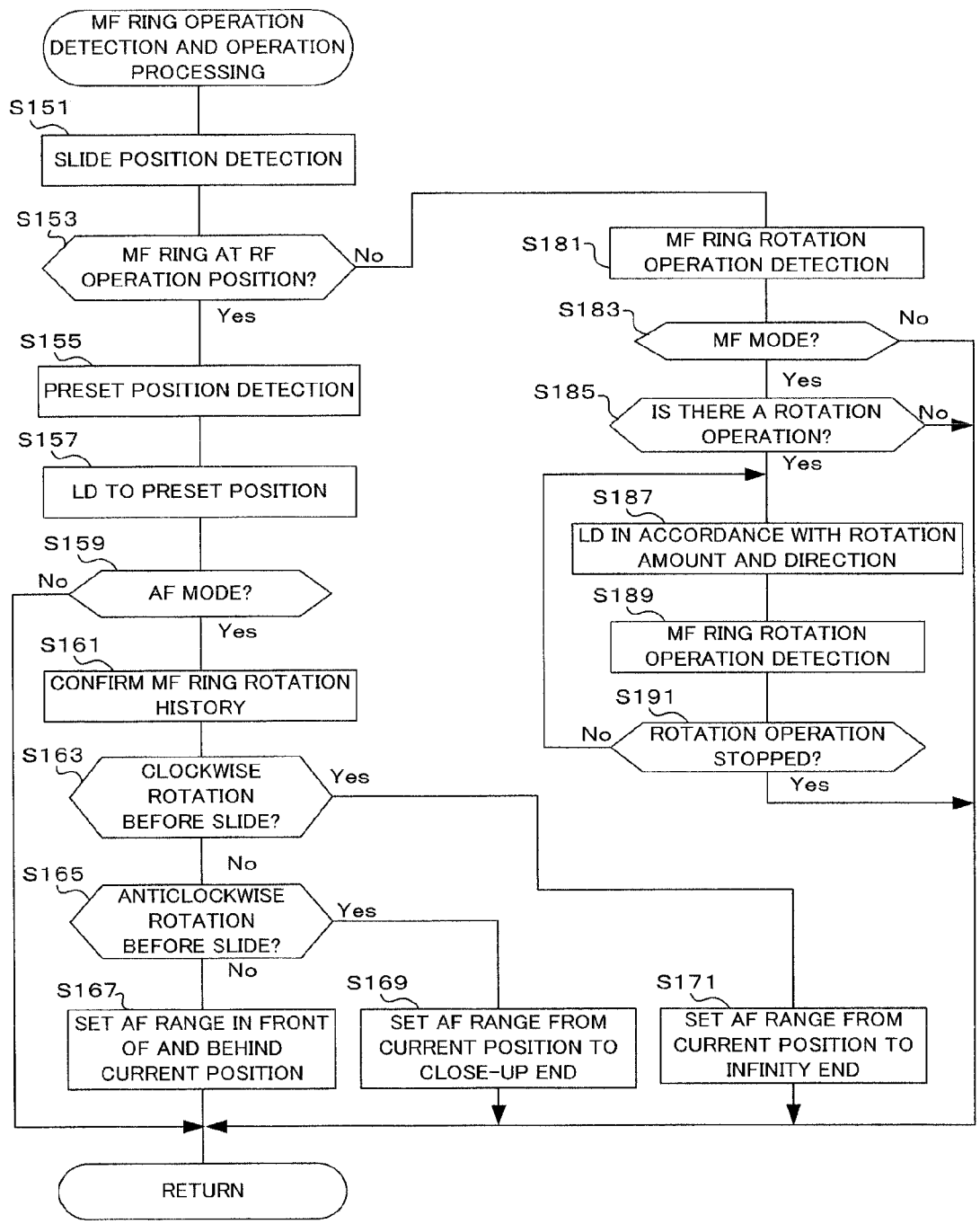
FIG. 14 is a flowchart showing MF ring operation detection and operation processing of the camera of the second embodiment of the present invention.

Also, with the second embodiment of the present invention, rotation direction of the MF ring 204 at the MF position (first position) immediately before sliding the MF ring 204 to the RF position is stored (refer to S181 in FIG. 14), and AF range setting is carried out using this rotation operation history (refer to S161-S171 of FIG. 14). This means that the photographer can easily carry out limiting of AF range by simply operating the MF ring 204 while looking at the subject in the viewfinder.

Also, with the second embodiment of the present invention, preset distance 311a-311c and AF range 313a-313c are displayed on the display monitor 105. As a result, it is possible for a photographer to easily confirm the set preset distance and the AF range at the same time as observing a subject through the viewfinder. Also, orientation of displaying preset distance that changes in accordance with rotation direction of the MF ring 204, and distance displayed on the display monitor 105, are made the same. For example, the alignment of the distance scale 24a shown in FIG. 4, and alignment direction of the distance scale shown in FIG. 18 are made the same. As a result, it is easy to intuitively grasp, and operability is improved.

Next, a modified example 1 of the MF ring operation detection and operation processing shown in FIG. 14 will be described using the flowchart shown it in FIG. 19. With the flow shown in FIG. 14, the MF ring 204 is slid to the RF position (second position), and after setting of an AF range in the MF ring operation detection and operation processing (refer to S15 of FIG. 9) if there is a slight offset from the focus position intended by the photographer with initial focusing (refer to S21), scanning AF is carried out again in the same AF range as previously by performing a first release operation. With this modified example 1, if there is a slight offset from the focus position intended by the photographer, scanning AF is carried out again with the initial focusing position as a reference by performing the first release operation.

Figure 19:
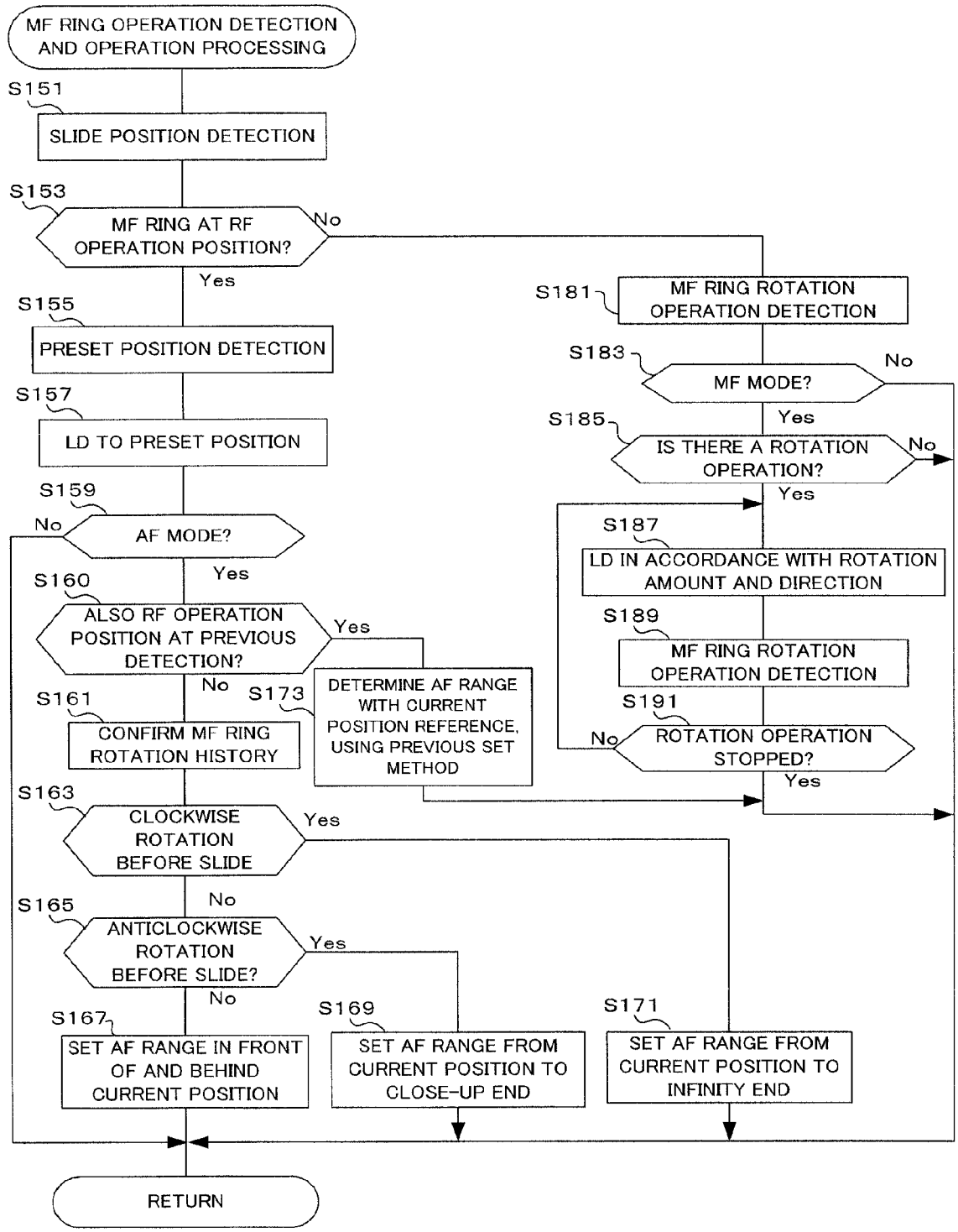
FIG. 19 is a flowchart showing a modified example 1 of MF ring operation detection and operation processing of the camera of the second embodiment of the present invention.

Compared to the flow shown in FIG. 14, flow of modified example 1 shown in FIG. 19 only has the addition of steps S160 and S173. Description will therefore center on these additional steps.

If the flow for MF ring operation detection and operation processing shown in FIG. 19 is entered, slide position detection is carried out (S151). In this step, as described previously, it is determined whether or not the MF ring 204 is at the MF position (first position) or at the RF position (second position), and the result of this determination is stored.

It is also determined in step S159 whether or not it is AF mode, and if the result of this determination is AF mode then determination is carried out as to whether the NFL ring was also at the RF operation position at the time of the previous detection (S160). Here, whether or not the position of the MF ring 204 at the time of the previous detection was the RF position is determined based on the stored result of the slide position detection in step S151.

If the result of determination in step S160 is that the MF ring 204 was not at the RF position, namely that previously it was the MF position and now it is the RF position, then as was described with the flow of FIG. 14, in step S161 and afterwards processing for limiting the AF range is executed.

On the other hand, if the result of determination in step S160 is that the MF ring 204 was at the RF position previously also, the AF range is determined using the previous setting method with the current position as a reference (S173). In the still picture photometry and AF of step S21 and the movie photometry and AF of step S35, scanning AF is executed using the AF range that has been set here.

In this manner, with modified example 1 of the MF ring operation detection and operation processing, using the first scanning AF, even if focusing was not carried out as the photographer intended, since the second scan AF is carried out with a focus position at the time of completion of the first AF as a reference, it is possible to rapidly carry out focus.

Next, modified example 2 of the MF ring operation detection and operation processing shown in FIG. 14 will be described using the flowchart shown in FIG. 20. With the flow shown in FIG. 14, when setting the AF range determination was made using a history of rotation operations of the MF ring 204 (refer S161 in FIG. 14). With modified example 2 however, in a case where the range in which the subject will exist is known in advance, or the photographer's preferred setting method can be set, it is possible to set an AF limit range on a menu screen.

Figure 20:
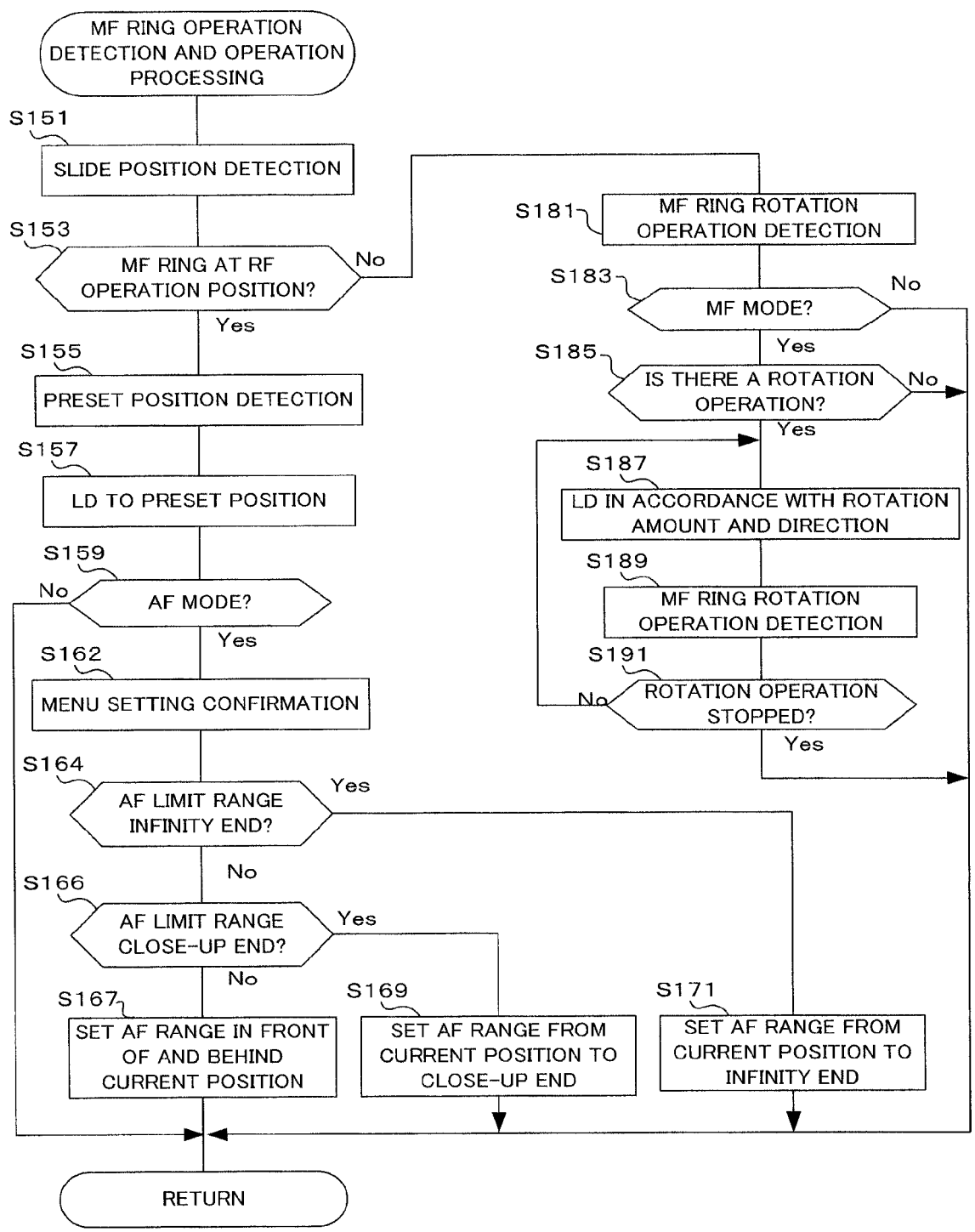
FIG. 20 is a flowchart showing modified example 1 of MF ring operation detection and operation processing of the camera of the second embodiment of the present invention.

Compared to the flow shown in FIG. 14, flow of modified example 2 shown in FIG. 20 only has steps S161 to S165 replaced with steps S162 to S166. Description will therefore center on these changed steps.

Before the flow for MF ring operation detection and operation processing shown in FIG. 20 is entered, either towards the infinity end, towards the close-up end, or in front of and behind, is set for the AF limit range on a menu screen.

The flow for MF ring operation detection and operation processing shown in FIG. 20 is entered, whether or not AF mode is set is determined in step S159, and if the result of this determination AF mode is set menu setting confirmation is next carried out (S162). Here, an AF limit range that has been set on the menu screen beforehand is read out.

After that, it is determined whether or not the AF limit range is towards the infinity and (S164). Here, determination is based on the AF limit range that was confirmed in step S162. If the result of this determination is toward the infinity end, then in step S171 an AF range from the current position to the infinity end is set.

If the result of determination in step S164 was not at the infinity end, it is next determined whether or not the AF limit range is towards the close-up end (S166). Here also, determination is based on the AF limit range that was confirmed in step S162. If the result of this determination is toward the close-up end, then in step S169 an AF range from the current position to the close-up end is set.

If the result of determination in step S166 was not the close-up end, in front of and behind the current position is set as the AF range (S167).

In this way, with modified example 2 of the MF ring operation detection and operation processing, direction of the AF limit range is set beforehand on a menu screen to either towards the infinity end, towards the close-up end, or in front of and behind. If the direction of the AF limit range in k own beforehand, or if the photographer has a definite setting preference, rapid setting is made possible. Setting on the menu screen is not limited to towards the infinity end and towards the close-up end etc., and any information that can limit the AF range is possible such as, for example, limit distance from a set distance etc. Setting is carried out on a menu screen here, but is not limited to a menu screen as long as it is a screen on which information can be set Next, a modified example 1 for still picture photometry and AF of FIG. 15 will be described using the flowchart shown in FIG. 21. With the flow shown in FIG. 15, if the detection was unsuccessful in step S211, processing in accordance with position of the MF ring 204 was executed immediately. Conversely, with this modified example, if peak detection is unsuccessful, the area in which focus point detection is carried out is widened and scan ranging is carried out.

Figure 15:
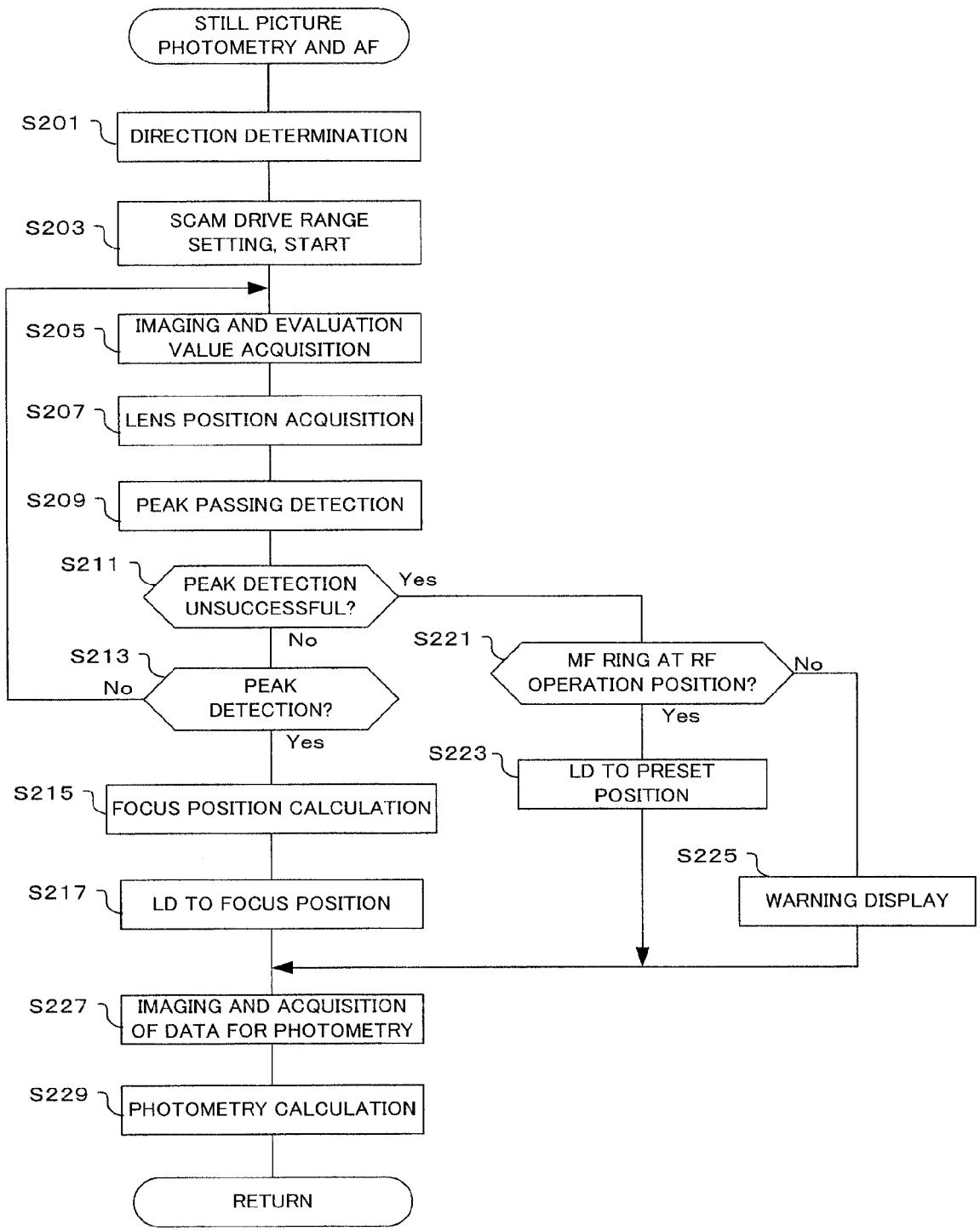
FIG. 15 is a flowchart showing still picture photometry and AF processing for the camera of the second embodiment of the present invention.
Figure 21:
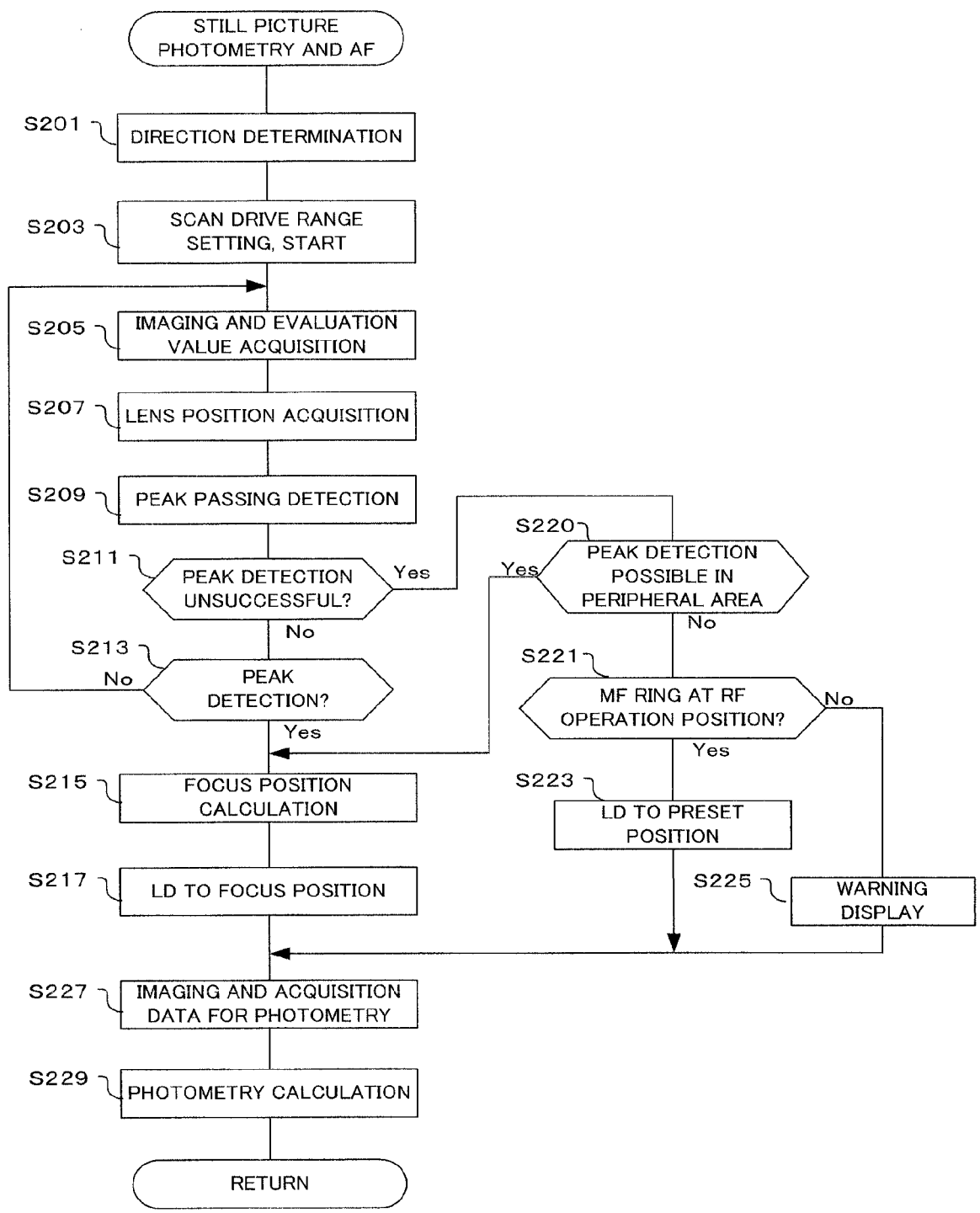
FIG. 21 is a flowchart showing modified example 1 of still picture photometry and AF processing for the camera of the second embodiment of the present invention.

Compared to the flow shown in FIG. 15, flow of modified example 1 shown in FIG. 21 only has step S220 added. Description will therefore center on this additional step.

Figure 22A:
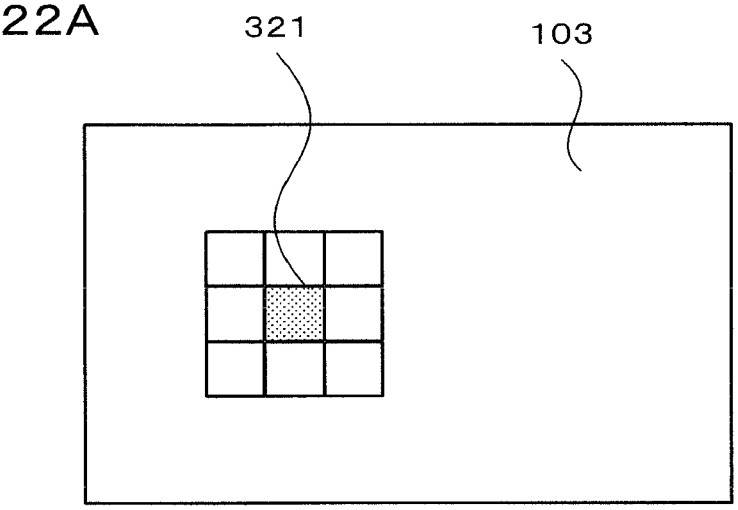
FIG. 22A and FIG. 22B are drawings for describing enlargement of distance measurement range in modified example 1 of still picture photometry and AF processing for the camera of the second embodiment of the present invention.

In step S211 it is determined whether or not peak detection is unsuccessful, and if the result of determination is that the detection could not be performed it is determined whether or not the detection is possible in the peripheral area (S220). Scanning AF carried out in steps S203-S213 involves calculation of AF evaluation value from image data of a total of 9 blocks, being a selected area 321 of the image sensor 103 and 8 adjacent blocks, and carrying out peak detection, as shown in FIG. 22A.

Figure 22B:
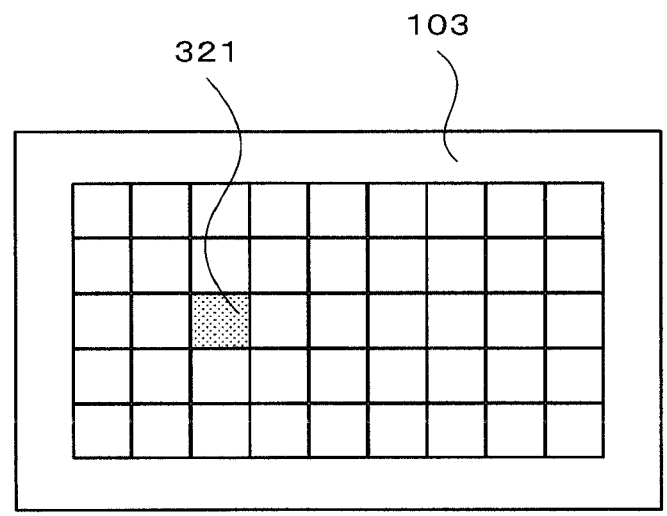

In step S220, as shown in FIG. 22B, an area for calculation of AF evaluation value is widened in a stepwise manner from the area adjacent to the selected area 321 of the image sensor 103 to a peripheral area, AF evaluation value is calculated from image data within the widened area, and peak detection is carried out. The selected area 321 is an area that has been automatically selected by face detection, or an area that has been selected by the photographer etc.

In step S220, if the detection was possible as a result of widening the ranging area to a peripheral area, processing advances to step S215 and after, and drive to a focus position is performed. On the other hand, if peak detection was not possible, processing advances to step S221 and processing is carried out in accordance with the position of the MF ring 204.

In this way, with modified example 1 of still picture photometry and AF, in a case where it is not possible to carry out peak detection using scan AF, a ranging area is widened. As a result, the possibility of the subject entering the ranging area and being focused on becomes higher.

Next, a modified example 2 for still picture photometry and AF shown in FIG. 15 will be described using the flowchart shown in FIG. 23. With the flow shown in FIG. 15, automatic focus detection was carried out using a so-called climbing method where peak value of AF evaluation value, that has been obtained by extracting a high-frequency component from a contrast signal of image data, is detected while driving the focusing lens 203 (scanning). With this modified example 2, focusing is carried out by detecting phase difference between image data that has been output from a pair of image sensors, using so-called phase difference AF.

With this modified example 2, a pair of image sensors for well-known phase difference detection are provided inside the camera body 100 at positions to receive subject light flux that has passed through the focusing lens 203, and a signal processing circuit for processing a signal from one image sensor is provided. Instead of the pair of image sensors, it is also possible to provide an image sensor having pairs of pixels arranged two dimensionally on an imaging surface.

Figure 23:
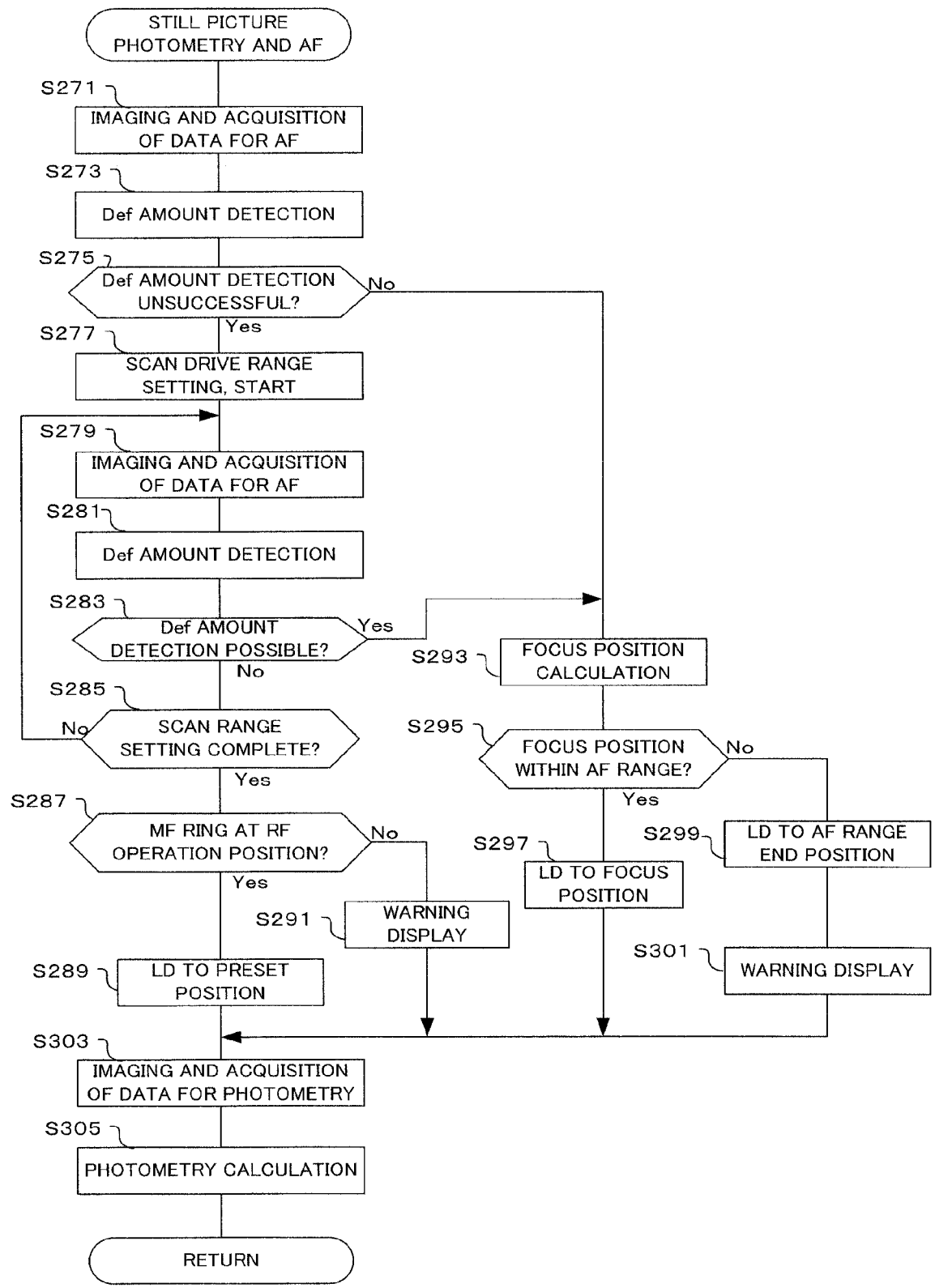
FIG. 23 is a flowchart showing a modified example 2 of still picture photometry and AF processing for the camera of the second embodiment of the present invention.

If the still picture photometry and AF flow shown in FIG. 23 is entered, first data for imaging and AF is acquired (S271).

Here imaging is carried out on a sensor for phase difference detection, and pixel data is acquired. Next, a defocus amount (Def) is detected (S273). Here, defocus amount is calculated by a well-known method using pixel data that was acquired in step S171.

Next it is determined whether or not detection of the focus amount is unsuccessful (S275). Here it is determined whether or not it was possible to calculate defocus amount in step S273. In cases such as where there is no contrast in the subject, it is not possible to detect the focus amount.

If the result of determination in step S275 is that detection of defocus amount was possible, calculation of focus position is carried out (S293). Here, focus position for the focusing lens 203 is calculated based on the detected the focus amount.

Once focus position has been calculated, it is determined whether or not the focus position is within the AF range (S295). AF range is set in steps S167-S171 of the MF ring operation detection and operation processing (refer to FIG. 14, FIG. 19, FIG. 20), and in this step it is determined whether or not the focus position that was calculated in step S293 is within the set AF range.

If the result of determination in step S295 is that the focus position is within the AF range, lens drive is carried out to the focus position (S297). On the other hand, if the focus position is not within the AF range, lens drive is carried out to an end position of the AF range (S299). Since there are two end positions of the AF range, the focusing lens 203 is driven to the AF range end position that is closest to the focus position.

Figure 25A:
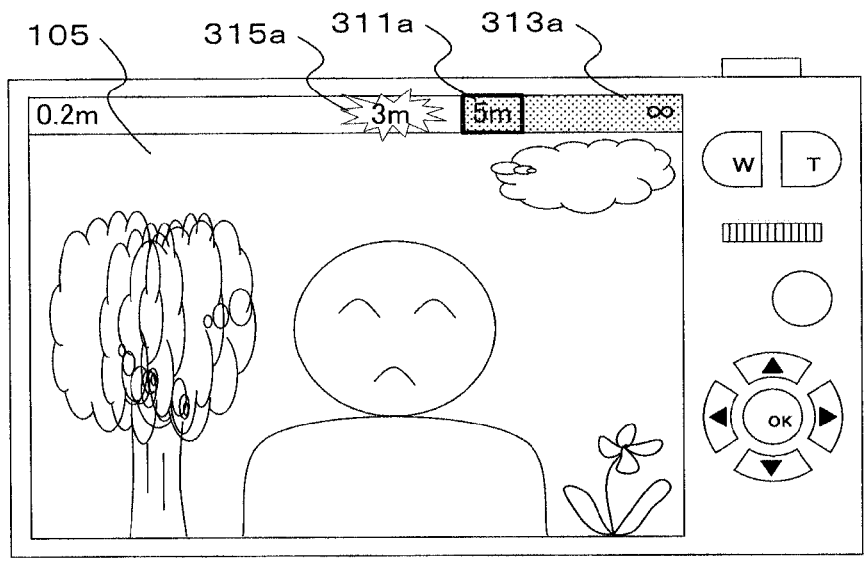
FIG. 25A-FIG. 25C are diagrams showing display states on a display section at the time of a limit AF operation, for limiting a range to be scanned, with a preset distance set, in a case where modified example 2 of still picture photometry and AF has been adopted, in the camera of the second embodiment of the present invention.
Figure 25B:
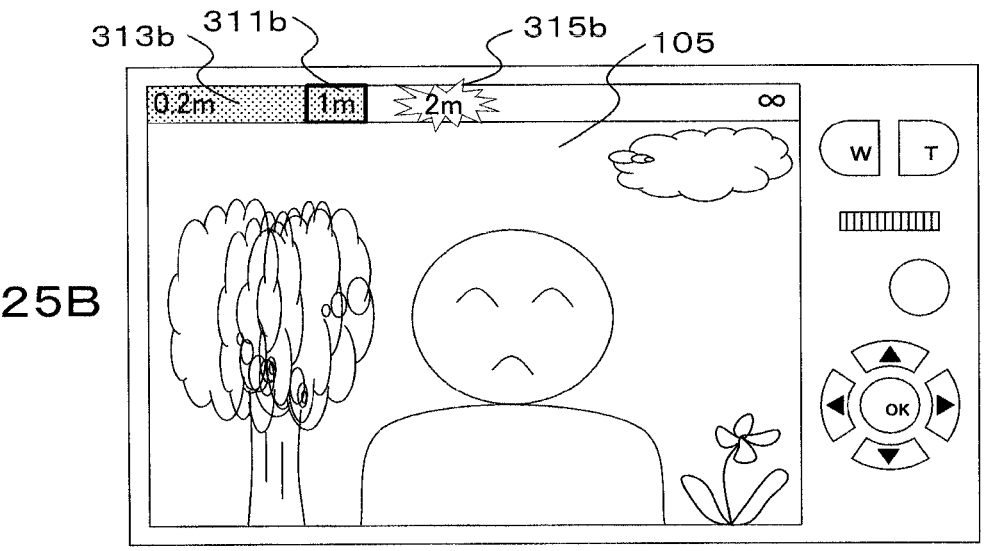
Figure 25C:
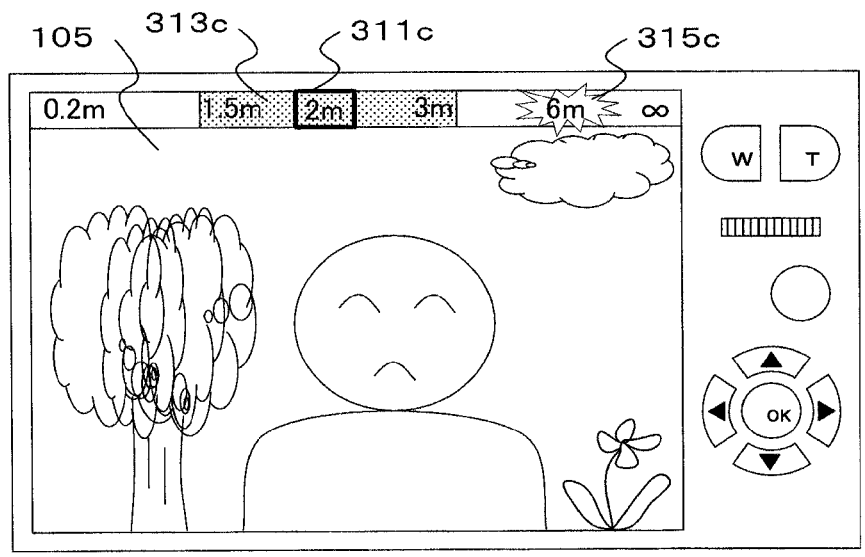

If lens drive to the AF range end position has been carried out, warning display is performed (S301). An example of warning display is shown in FIG. 25. FIG. 25A is a case where the AF range has been set from 5 m to the infinity end, and a focus point has been detected by phase contrast AF at 3 m. In this case, the warning display 315a is displayed together with the detected focal length. Similarly in FIG. 25B a warning display 315b is displayed together with detected focal length (2 m in the illustrated example). Also, in FIG. 25C, warning display 315c is displayed together with the detected focal length (6 m in the illustrated example). The form of the warning display is not limited to the illustrative examples, and other formats are possible, and it is also possible to use another display method such as flashing the focal length.

If the result of determination in step S275 is that detection of defocus amount was unsuccessful, setting of a scan drive range is carried out, and scanning drive is commenced (S277). AF range is set in steps S167-S171 of the MF ring operation detection and operation processing (refer to FIG. 14, FIG. 19, FIG. 20), and in this step scanning drive range is set based on the set AF range.

In the case of automatic focus with the climbing method using contrast AF, the scanning drive range (lens drive range) is made wider than the AF range for peak detection, as was described using FIG. 17. However, in the case of phase difference AF, since in principal it is not necessary to drive the focusing lens 203, the scanning drive range (LD range) can be the same as the AF range, as shown in FIG. 24.

Figure 24A:
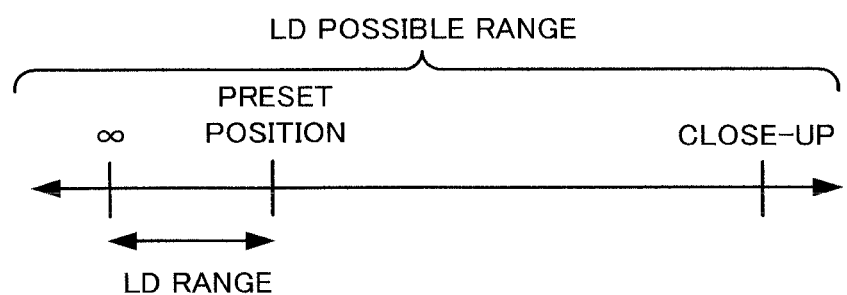
FIG. 24 is a diagram showing a range for limiting scan for focusing, in modified example 2 of still picture photometry and AF, in the camera of the second embodiment of the present invention.
Figure 24B:
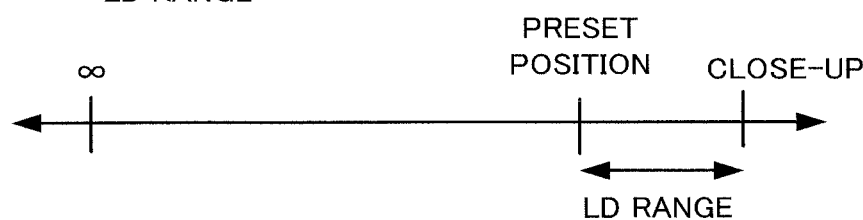
Figure 24C:
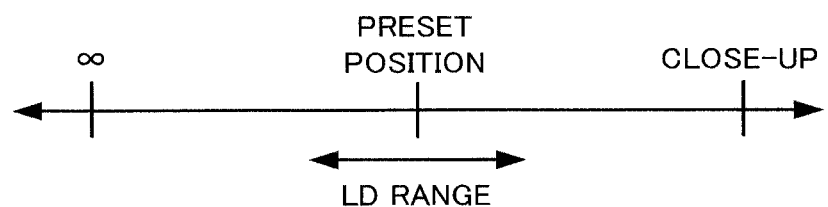

In a case where the AF range has been set from the preset position to the infinity end in step S171, then the lens drive range (LD range) is also set from the preset position to the infinity end, as shown in FIG. 24A. Also, in the case where AF range has been set from the preset position to the close-up end in step S169, then the lens drive range (LD range) is also set from the preset position to the close up end, as shown in FIG. 24B. Also, in the case where AF range has been set in front of and behind the preset position in step S167, then the lens drive range (LD range) is the same as the AF range.

If the scanning drive range has been set, the lens drive circuit 222 commences drive of the focusing lens 203 in the set lens drive direction while referencing detection results from the lens position detection circuit 223.

Next, data for imaging and AF is acquired (S279). Here pixel data is acquired from a sensor for phase difference detection. Once pixel data has been acquired, defocus amount is detected (S281). Is detection of defocus amount has been carried out, it is determined whether or not it is possible to detect defocus amount (S283). As described previously, there are cases where it is impossible to detect the focus amount, such as with a dull subject with no contrast. If the result of this determination is that detection of the focus amount is possible, processing advances to previously described step S293 and after, and the focusing lens 203 is driven to the focus point If the result of determination in step S283 is that defocus amount could not be detected, it is next determined whether or not scan range drive has been completed (S285). It is determined whether or not the focusing lens 203 has been driven in the scan drive range that was set in step S277. If scanning drive is in progress the determination is No. If the result of this determination is that drive of the scan range has not been completed, processing returns to step S279 and defocus amount is detected while carrying out scanning drive.

If the result of determination in step S285 is that driving of the scan range has been completed, it is next determined whether or not the MF ring 204 is at the RF position (S287). If the result of determination in step S285 is that driving of the scan range has been completed, it means that focusing is not possible. Processing is then carried out in accordance with the position of the MF ring 204.

If the result of determination in step S287 is that the MF ring 204 is at the RF position (second position), the focusing lens 203 is driven by a distance corresponding to the preset position that was set on the MF ring 204 (S289). On the other hand, if the result of determination in step S287 is that the MF ring 204 is at the MF position (first position), warning display is carried out (S291). Warning display of the fact that focusing is not possible is by means of flashing a focus mark etc.

If lens drive to the preset position has been carried out in step S289, or if warning display has been carried out in step S291, or if lens drive to a focus position has been carried out in step S297, or if warning display has been carried out in step S301, the AF operation is completed, and is followed by photometry in step S303 and after.

First, imaging and acquisition of image data for photometry are carried out (S303). Here, imaging for photometry is carried out, and image data for photometry is acquired. Next, photometry and exposure value calculation are carried out (#11). Here, parameters such as shutter speed and aperture value for exposure control are calculated from the acquired image data. Once the photometry calculation has been performed, the original processing flow is returned to.

In this way, with modified example 2 of the still picture photometry and AF, automatic focusing is carried out using phase difference AF instead of contrast AF with a climbing method. With this modified example also a range for scanning drive at the time of limited AF is limited using an AF range that has been set by MF ring operation detection and operation processing. As a result, it is possible to focus on the subject as intended by the photographer rapidly and accurately. It is also possible to adopt phase difference AF in the flow for still picture photometry and AF shown in FIG. 16, as with this modified example.

As has been described above, with the second embodiment of the present invention and the modified examples of the second embodiment, switching of focusing mode (either RF mode, or MF or AF mode) is carried out based on a slide direction of a ring member (MF ring 204) that has been determined by a slide position determination section (MF ring position detection circuit 224), and if the ring member is at the second position focusing of the focusing lens 203 is carried out automatically in limit AF mode that uses a preset distance. In this case, it is possible to set the AF range using the preset distance. As a result, it is possible to provide a camera having good operability with which it is possible to carry out focusing on a subject as the photographer intends, rapidly and accurately.

Also, with the second embodiment of the present invention and the modified examples thereof, after a rotation operation of the ring member (MF ring 204) to a first position, it is possible to set limit AF in accordance with a rotation operation and preset distance by carrying out slide movement to a second position and setting the preset distance. As a result, it is possible to carry out focusing rapidly and with good operability.

With the second embodiment of the present invention, both AF mode and MF mode are switched at the camera body 100, but the focusing modes at the camera body 100 side are not limited to two modes, and it is also possible to provide other focusing modes, and it is also possible to only provide one or the other of the AF mode and the MF mode.

Also, with the second embodiment of the present invention, the MF ring 204, as the ring member, has been moved between two positions, namely a first position and a second position, but it is also possible to provide other positions, such as a third position.

Also, with the first and second embodiments of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

Also, regarding the operation flow in the patent claims, the specification and the drawings, for the sake of convenience description has been given using words representing sequence, such as "first" and "next", but this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument, comprising:
    a body;
    a lens barrel, capable of being attached to and detached from the body, and a focusing lens arranged inside the lens barrel;
    a ring member arranged to rotate about the optical axis of the focusing lens of the lens barrel, and arranged to slide along the optical axis between a first position and a second position;
    a mode setting section, provided on the body, for setting a focusing mode to either auto-focus (AF) mode or manual focus (MF) mode;
    a focus detection section, provided in the body; and
    a control section that, (1) when it has been detected that the ring member is at the first position and the AF mode has been set by the mode setting section, carrying out focusing of the focusing lens in accordance with lens control commands corresponding to output of the focus detection section, (2) when it has been detected that the ring member is at the first position and the MF mode has been set by the mode setting section, carrying out focusing of the focusing lens in accordance with rotation of the ring member, and (3) when it has been detected that the ring member has been slid from the first position to the second position, carrying out focusing of the focusing lens in accordance with a distance corresponding to an absolute position of the ring member in rotation direction, regardless of an operating state of AF mode or MF mode, the act of carrying out focusing of the focusing lens in accordance with a distance corresponding to an absolute position of the ring member in rotation direction when it has been detected that the ring member has been slid from the first position to the second position, regardless of an operating state of AF mode or MF mode, being controlled by the control section provided on the lens barrel, and when an operating state is set to AF mode, the control section stops receiving the lens control commands that are transmitted from the body.

2. The optical instrument of claim 1 wherein the mode setting section permits the focusing mode to be set to either the auto-focus (AF) mode or the manual focus (MF) mode via a menu screen.

3. The optical instrument of claim 1 wherein the control section carries out focusing of the focusing lens in accordance with a distance corresponding to an absolute position of the ring member when it has been detected that the ring member has been slid from the first position to the second position, regardless of a viewfinder mode of the optical instrument.

4. A control method for a lens barrel comprising a focusing lens provided in a lens barrel, capable of being attached to and detached from a camera body, a ring member that is arranged to be rotatable with respect to a lens barrel, and to be slidable between a first position and a second position, and a focusing mode setting section, for setting focusing mode, provided on a camera body, comprising:
    performing focusing in accordance with lens control commands transmitted from the camera body and a focusing mode that has been set in the focusing mode setting section when the ring member is in the first position; and
    responsive to a determination that the ring member is in the second position, stopping focusing in accordance with the focusing mode that was set in the focusing mode setting section, and performing focusing of the focusing lens to a distance corresponding to an absolute position of the ring member in rotation direction, regardless of the focusing mode that was set by the focusing mode setting section, and the lens barrel stops receiving the lens control commands that are transmitted from the camera body.

5. The control method of claim 4 wherein the focusing mode that has been set by the focusing mode setting section is one of (A) an auto-focus (AF) focusing mode and (B) a manual focus (MF) focusing mode, and
    wherein the focusing of the focusing lens to a distance corresponding to an absolute position of the ring member, regardless of the focusing mode that was set in the focusing mode setting section, responsive to a determination that the ring member is in the second position, is a range focusing (RF) mode.

6. The control method of claim 5 wherein the focusing mode setting section permits the focusing mode to be set to either the auto-focus focusing mode or the manual focus focusing mode via a menu screen.

7. The control method of claim 4 wherein the acts of (1) stopping focusing in accordance with the focusing mode that was set in the focusing mode setting section, and (2) performing focusing of the focusing lens to a distance corresponding to an absolute position of the ring member, responsive to a determination that the ring member is in the second position, is performed regardless of a viewfinder mode of the camera body.

* * * * *